US012236917B2

(12) United States Patent
Li et al.

(10) Patent No.: US 12,236,917 B2
(45) Date of Patent: Feb. 25, 2025

(54) LARGER BACKPLANE SUITABLE FOR HIGH SPEED APPLICATIONS

(71) Applicant: GOOGLE LLC, Mountain View, CA (US)

(72) Inventors: Bo Li, Clara, CA (US); Kaushik Sheth, Hsinchu (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/067,267

(22) Filed: Dec. 16, 2022

(65) Prior Publication Data

US 2023/0197029 A1 Jun. 22, 2023

Related U.S. Application Data

(63) Continuation of application No. 17/354,419, filed on Jun. 22, 2021, now Pat. No. 11,538,431.

(60) Provisional application No. 63/045,252, filed on Jun. 29, 2020.

(51) Int. Cl.
*G09G 3/36* (2006.01)

(52) U.S. Cl.
CPC ....... *G09G 3/3688* (2013.01); *G09G 2360/12* (2013.01)

(58) Field of Classification Search
CPC ....... G09G 2300/0857; G09G 2360/12; G09G 3/32; G09G 2300/0452
See application file for complete search history.

(56) References Cited

U.S. PATENT DOCUMENTS

| | | | |
|---|---|---|---|
| 2,403,731 | A | 7/1946 | Macneille |
| 3,936,817 | A | 2/1976 | Levy et al. |
| 4,432,610 | A | 2/1984 | Kobayashi et al. |
| 4,825,201 | A | 4/1989 | Watanabe et al. |
| 4,923,285 | A | 5/1990 | Ogino et al. |
| 4,996,523 | A | 2/1991 | Bell et al. |

(Continued)

FOREIGN PATENT DOCUMENTS

| | | |
|---|---|---|
| EP | 0658870 A2 | 6/1995 |
| EP | 1187087 A1 | 3/2002 |

(Continued)

OTHER PUBLICATIONS

"2114A 1024 x4 Bit Static RAM", Component Data Catalog, Intel Corp., Santa Clara, CA, USA, 1982, 7 pages.

(Continued)

*Primary Examiner* — Van N Chow
(74) *Attorney, Agent, or Firm* — Brake Hughes Bellermann LLP

(57) ABSTRACT

A display system comprising a plurality of display controller circuits controlling a like number of independent segments of pixel drive circuits of a backplane. Each pixel drive circuit comprises a memory element and associated pixel drive circuitry. The segments of the backplane may be organized vertically. The word line for the memory cells of a first segment of pixel drive circuits passes underneath a second segment of pixel drive circuits without directly interacting with the pixel drive circuits of the second segment in order to reach the pixel drive circuits of the first segment. The plurality of display controller circuits operate asynchronously but are kept at the same frame rate by an external signal such as Vsync.

19 Claims, 10 Drawing Sheets

(56) References Cited

U.S. PATENT DOCUMENTS 5,018,838 A 5/1991 Barnes et al.
5,144,418 A 9/1992 Brown et al.
5,157,387 A 10/1992 Momose et al.
5,189,406 A 2/1993 Humphries et al.
5,317,334 A 5/1994 Sano
5,359,342 A 10/1994 Nakai et al.
5,471,225 A 11/1995 Parks
5,473,338 A 12/1995 Prince et al.
5,497,172 A 3/1996 Doherty et al.
5,537,128 A 7/1996 Keene et al.
5,548,347 A 8/1996 Melnik et al.
5,566,010 A 10/1996 Ishii et al.
5,602,559 A 2/1997 Kimura
5,619,228 A 4/1997 Doherty
5,731,802 A 3/1998 Aras et al.
5,751,264 A 5/1998 Cavallerano et al.
5,767,832 A 6/1998 Koyama et al.
5,818,413 A 10/1998 Hayashi et al.
5,905,482 A 5/1999 Hughes et al.
5,926,158 A 7/1999 Yoneda et al.
5,926,162 A 7/1999 Wood et al.
5,929,162 A 7/1999 Horne et al.
5,936,603 A 8/1999 Lippmann et al.
5,936,604 A 8/1999 Endou
5,945,972 A 8/1999 Okumura et al.
5,959,598 A 9/1999 McKnight
5,969,512 A 10/1999 Matsuyama
5,969,701 A 10/1999 Numao et al.
5,986,640 A 11/1999 Baldwin et al.
6,005,558 A 12/1999 Hudson et al.
6,034,659 A 3/2000 Wald et al.
6,046,716 A 4/2000 McKnight
6,067,065 A 5/2000 Worley et al.
6,121,948 A 9/2000 Worley et al.
6,127,991 A 10/2000 Uehara et al.
6,144,356 A 11/2000 Weatherford et al.
6,151,011 A 11/2000 Worley et al.
RE37,056 E 2/2001 Wortel et al.
6,201,521 B1 3/2001 Doherty
6,262,703 B1 7/2001 Perner
6,285,360 B1 9/2001 Li
6,297,788 B1 10/2001 Shigeta et al.
6,317,112 B1 11/2001 Handschy et al.
6,369,782 B2 4/2002 Shigeta
6,424,330 B1 7/2002 Johnson
6,456,267 B1 9/2002 Sato et al.
6,476,792 B2 11/2002 Hattori et al.
6,518,945 B1 2/2003 Pinkham
6,567,138 B1 5/2003 Krusius et al.
6,587,084 B1 7/2003 Alymov et al.
6,603,452 B1 8/2003 Serita
6,621,488 B1 9/2003 Takeuchi et al.
6,690,432 B2 2/2004 Janssen et al.
6,717,561 B1 4/2004 Pfeiffer et al.
6,731,306 B2 5/2004 Booth et al.
6,744,415 B2 6/2004 Waterman et al.
6,762,739 B2 7/2004 Bone
6,784,898 B2 8/2004 Lee et al.
6,788,231 B1 9/2004 Hsueh
6,806,871 B1 10/2004 Yasue
6,831,626 B2 12/2004 Nakamura et al.
6,850,216 B2 2/2005 Akimoto et al.
6,862,012 B1 3/2005 Funakoshi et al.
6,924,824 B2 8/2005 Adachi et al.
6,930,667 B1 8/2005 Ijima et al.
6,930,692 B1 8/2005 Coker et al.
7,066,605 B2 6/2006 Dewald et al.
7,067,853 B1 6/2006 Yao
7,088,325 B2 8/2006 Ishii
7,088,329 B2 8/2006 Hudson
7,129,920 B2 10/2006 Chow
7,187,355 B2 3/2007 Tam et al.
7,379,043 B2 5/2008 Worley et al.
7,397,980 B2 7/2008 Frisken
7,443,374 B2 10/2008 Hudson
7,468,717 B2 12/2008 Hudson
7,692,671 B2 4/2010 Ng
7,852,307 B2 12/2010 Hudson
7,990,353 B2 8/2011 Chow
8,040,311 B2 10/2011 Hudson et al.
8,111,271 B2 2/2012 Hudson et al.
8,264,507 B2 9/2012 Hudson et al.
8,421,828 B2 4/2013 Hudson et al.
8,643,681 B2 2/2014 Endo et al.
9,047,818 B1 6/2015 Day et al.
9,117,746 B1 8/2015 Clark et al.
9,406,269 B2 8/2016 Lo et al.
9,583,031 B2 2/2017 Hudson et al.
9,824,619 B2 11/2017 Hudson et al.
9,858,988 B1 1/2018 Ghosh et al.
9,918,053 B2 3/2018 Lo et al.
10,437,402 B1 10/2019 Pan
10,957,272 B2 3/2021 Li et al.
11,043,262 B2 6/2021 Madhavan et al.
2001/0013844 A1 8/2001 Shigeta
2002/0024481 A1 2/2002 Kawabe et al.
2002/0041266 A1 4/2002 Koyama et al.
2002/0043610 A1 4/2002 Lee et al.
2002/0135309 A1 9/2002 Okuda
2002/0140662 A1 10/2002 Igarashi
2002/0158825 A1 10/2002 Endo et al.
2003/0058195 A1 3/2003 Adachi et al.
2003/0156102 A1 8/2003 Kimura
2003/0174117 A1 9/2003 Crossland et al.
2003/0202412 A1 10/2003 Nii et al.
2003/0210257 A1 11/2003 Hudson et al.
2004/0032636 A1 2/2004 Willis
2004/0080482 A1 4/2004 Magendanz et al.
2004/0125090 A1 7/2004 Hudson
2004/0174328 A1 9/2004 Hudson
2005/0001794 A1 1/2005 Nakanishi et al.
2005/0001806 A1 1/2005 Ohmura
2005/0052437 A1 3/2005 Hudson
2005/0057466 A1 3/2005 Sala et al.
2005/0062765 A1 3/2005 Hudson
2005/0088462 A1 4/2005 Borel
2005/0195894 A1 9/2005 Kim et al.
2005/0200300 A1 9/2005 Yumoto
2005/0264586 A1 12/2005 Kim
2006/0012589 A1 1/2006 Hsieh et al.
2006/0012594 A1 1/2006 Worley et al.
2006/0066645 A1 3/2006 Ng
2006/0147146 A1 7/2006 Voigt et al.
2006/0208961 A1 9/2006 Nathan et al.
2006/0284903 A1 12/2006 Ng
2006/0284904 A1 12/2006 Ng
2007/0001969 A1 1/2007 Kodaira et al.
2007/0247939 A1 10/2007 Nahas et al.
2007/0252855 A1 11/2007 Hudson
2007/0252856 A1 11/2007 Hudson et al.
2008/0007576 A1 1/2008 Ishii et al.
2008/0088613 A1 4/2008 Hudson et al.
2008/0101143 A1 5/2008 Jung et al.
2008/0158437 A1 7/2008 Arai et al.
2008/0218438 A1 9/2008 Aral et al.
2008/0259019 A1 10/2008 Ng
2009/0027360 A1 1/2009 Kwan et al.
2009/0027364 A1 1/2009 Kwan et al.
2009/0115703 A1 5/2009 Cok
2009/0207165 A1 8/2009 Shirai et al.
2009/0284671 A1 11/2009 Leister
2009/0303248 A1 12/2009 Ng
2010/0073270 A1 3/2010 Ishii et al.
2010/0214646 A1 8/2010 Sugimoto et al.
2010/0253995 A1 10/2010 Reichelt
2010/0295836 A1 11/2010 Matsumoto et al.
2011/0109299 A1 5/2011 Chaji et al.
2011/0109670 A1 5/2011 Sempel et al.
2011/0199405 A1 8/2011 Dallas et al.
2011/0205100 A1 8/2011 Bogaerts
2011/0227887 A1 9/2011 Dallas et al.
2012/0086733 A1 4/2012 Hudson et al.
2012/0113167 A1 5/2012 Margerm et al.
2012/0257457 A1 10/2012 Park

(56) References Cited

U.S. PATENT DOCUMENTS

| | | | | |
|---|---|---|---|---|
| 2013/0038585 | A1 | 2/2013 | Kasai | |
| 2013/0128656 | A1 | 5/2013 | Rimondi et al. | |
| 2013/0308057 | A1 | 11/2013 | Lu et al. | |
| 2014/0085426 | A1 | 3/2014 | Leone et al. | |
| 2014/0092105 | A1 | 4/2014 | Guttag et al. | |
| 2015/0067290 | A1 | 3/2015 | Chaba et al. | |
| 2015/0155054 | A1 | 6/2015 | Lee et al. | |
| 2015/0245038 | A1 | 8/2015 | Clatanoff et al. | |
| 2016/0203801 | A1 | 7/2016 | De Groot et al. | |
| 2016/0365055 | A9 | 12/2016 | Hudson et al. | |
| 2017/0061867 | A1 * | 3/2017 | Cok | G09G 3/2022 |
| 2018/0012649 | A1 | 1/2018 | Ghosh et al. | |
| 2018/0061302 | A1 | 3/2018 | Hu et al. | |
| 2018/0114800 | A1 | 4/2018 | Pan | |
| 2018/0197471 | A1 * | 7/2018 | Rotzoll | G09G 3/2003 |
| 2019/0114987 | A1 | 4/2019 | Li et al. | |
| 2019/0259346 | A1 | 8/2019 | Amarilio | |
| 2019/0347994 | A1 | 11/2019 | Lin et al. | |
| 2020/0098307 | A1 | 3/2020 | Li et al. | |
| 2021/0201771 | A1 | 7/2021 | Li et al. | |
| 2021/0256901 | A1 | 8/2021 | Hudson et al. | |
| 2021/0407455 | A1 * | 12/2021 | Li | G09G 3/32 |

FOREIGN PATENT DOCUMENTS

| | | | |
|---|---|---|---|
| GB | 2327798 | A | 2/1999 |
| JP | 7049663 | A | 2/1995 |
| JP | 2002116741 | A | 4/2002 |
| TW | 227005 | B | 7/1994 |
| TW | 407253 | B | 10/2000 |
| TW | 418380 | B | 1/2001 |
| TW | 482991 | B | 4/2002 |
| TW | 483282 | B | 4/2002 |
| TW | 200603192 | A | 1/2006 |
| WO | 0070376 | A1 | 11/2000 |
| WO | 0152229 | A1 | 7/2001 |
| WO | 2007127849 | A2 | 11/2007 |
| WO | 2007127852 | A2 | 11/2007 |

OTHER PUBLICATIONS

Drabik "Optically Interconnected Parallel Processor Arrays", pp. 121-126, Dec. 1989, Georgia Institute of Technology.

Rabaey "Digital Integrated Circuits" pp. 138-140, 2016, Saurabh Printers Pvt. Ltd.

"Sony 3D", screen capture from video clip, 2009, 2 pages.

Amon , et al., "PTAT Sensors Based on SJFETs", 10th Mediterranean Electrotechnical Conference, MEleCon, vol. II, 2000, pp. 802-805.

Anderson , et al., "Holographic Data Storage: Science Fiction or Science Fact", Akonia Holographics LLC, presented at Optical Data Storage, 2014, 8 pages.

Armitage , et al., "Introduction to Microdisplays", John Wiley & Sons, 2006, pp. 182-185.

Baker , "CMOS Circuit Design, Layout, and Simulation", IEEE Press Series on Microelectronic Systems, John Wiley & Sons, Inc., Publication, 2010, pp. 614-616.

Campardo , et al., "VLSI—Design of Non-Volatile Memories", Springer, 2005, pp. 183-188.

Colgan , et al., "On-Chip Metallization Layers for Reflective Light Waves", Journal of Research Development, vol. 42, No. 3/4, May-Jul. 1998, pp. 339-345.

CSE370 , "Flip-Flops", Lecture 14, https://studylib.net/doc/18055423/flip-flops, no date, pp. 1-17.

Dai , et al., "Characteristics of LCoS Phase-only spatial light modulator and its applications", Optics Communications vol. 238, especially section 3.2, 2004, pp. 269-276.

Drabik , "Optically Interconnected Parallel Processor Arrays", A Thesis, Georgia Institute of Technology, Dec. 1989, pp. 121-126.

Fuller , "Static Random Access Memory—SRAM", Rochester Institute of technology to Microelectronic Engineering, Nov. 18, 2016, pp. 1-39.

Hu , "Complementary MOS (CMOS) Technology", Feb. 13, 2009, pp. 198-200.

Jesacher , et al., "Broadband suppression of the zero diffraction order of an SLM using its extended phase modulation range", Optics Express, vol. 22, No. 14, Jul. 14, 2014, pp. 17590-17599.

Kang , et al., "Digital Driving of TN-LC for WUXGA LCOS Panel", Digest of Technical Papers, Society for Information Display, 2001, pp. 1264-1267.

Nakamura , et al., "Modified drive method for OCB LSD", Proceeding of the International Display Research Conference, Society for Information Display, Campbell, CA, US, 1997, 4 pages.

Ong , "Modern Mos Technology: Processes, Devices, and Design", McGraw-Hill Book Company, 1984, pp. 207-212.

Oton , et al., "Multipoint phase calibration for improved compensation of inherent wavefront distortion in parallel aligned liquid crystal on silicon display", Applied Optics, vol. 46, No. 23, Optical Society of America, 2007, pp. 5667-5679.

Pelgrom , et al., "Matching Properties of MOS Transistors", IEEE Journal of Solid-State Circuits, vol. 23, No. 5, Oct. 1989, 8 pages.

Potter , et al., "Optical correlation using a phase-only liquid crystal over silicon spatial light modulator", SPIE 1564 Opt. Info. Proc. Sys & Arch. III;, 1991, pp. 363-372.

Product Description , "Westar's Microdisplay Inspection System", www.westar.com/mdis, Jan. 2000, 2 pages.

Rabaey , et al., "Digital Integrated Circuits", A Design Perspective, Second Edition, Saurabh Printers Pvt. Ltd, 2016, pp. 138-140.

Rabaey , "The Devices Chapter 3", Jan. 18, 2002, pp. 121-124.

Robinson , et al., "Polarization Engineering for LCD Projection", John Wiley and Sons, Ltd., Chichester, England, 2005, pp. 121-123.

Sloof , et al., "An Improved WXGA LCOS Imager for Single Panel Systems", Proceedings of the Asia Symposium on Information Display, Society for Information Display, Campbell, CA, US, 2004, 4 pages.

SMPTE 274M—2005 , "1920 × 1080 Image Sample Structure, Digital Representation and Digital Timing Reference Sequences for Multiple Picture Rates", SMPTE, White Plains, New York, US, 2005, 29 pages.

Underwood , et al., "Evaluation of an nMOS VLSI array for an adaptive liquid-crystal spatial light modulator", IEEE Proc, v.133 PI.J. No., Feb. 1986, 15 pages.

Wang , "Studies of Liquid Crystal Response Time", University of Central Florida, Doctoral Dissertation, 2005, 128 pages.

Wu , "Discussion #9 MOSFETs", University of California at Berkeley College of Engineering Department of Electrical Engineering and Computer Sciences, Spring 2008, pp. 1-7.

International Search Report and Written Opinion for PCT Application No. PCT/US2023/060174, mailed on Mar. 14, 2023, 17 pages.

* cited by examiner

LARGER BACKPLANE SUITABLE FOR HIGH SPEED APPLICATIONS

CROSS REFERENCE TO RELATED APPLICATIONS

This present application is a continuation of U.S. patent application Ser. No. 17/354,419, filed on Jun. 22, 2021, which claims the benefits of U.S. Provisional Patent Application No. 63/045,252, filed on Jun. 29, 2020, the disclosures of which are incorporated by reference herein in their entireties.

This present application is related to U.S. patent application Ser. No. 17/568,831, filed on Jan. 5, 2022, which claims the benefits of U.S. Provisional Patent Application No. 63/045,252, filed on Jun. 29, 2020, the disclosures of which are incorporated by reference herein in their entireties.

FIELD

The present invention relates to the design of a backplane useful to drive an array of pixels comprising drive circuits at each pixel and to a display fabricated with such a backplane. More particularly, the present invention relates to a backplane of substantial size that is able to deliver data to a memory cell of each pixel drive circuit without excessive delay, thereby improving image quality.

BACKGROUND

Applicant has developed a variety of backplanes comprising drive circuits of various types wherein a memory cell stores modulation data for each individual pixel. A recently developed large backplane has been made possible through the development of innovative means for delivering the modulation data to each pixel drive circuit.

Applicant applies these methods for reducing the time required to deliver image data to backplanes for liquid crystal displays as well as for emissive displays. Both use pulse width modulation techniques originally developed for liquid crystal on silicon (LCOS) display that have proved adaptable to emissive displays. The basis for these modulation techniques is to store modulation data in a SRAM memory cell with complementary outputs to determine what state the pixel drive circuit is in. The output of the SRAM cell is asserted onto a circuit element within the pixel drive circuit, thereby determining the output of the pixel drive circuit.

Other applications requiring the rapid delivery of data to an array of pixel drive circuits are conceived. All potential variations are included within the scope of the present invention.

SUMMARY

It is therefore an object of the present invention to improve on a backplane comprising an array of pixel drive circuits by improving the speed by which the backplane receives and applies its modulation data through usage of parallelism.

DETAILED DESCRIPTION

Figure 1A:
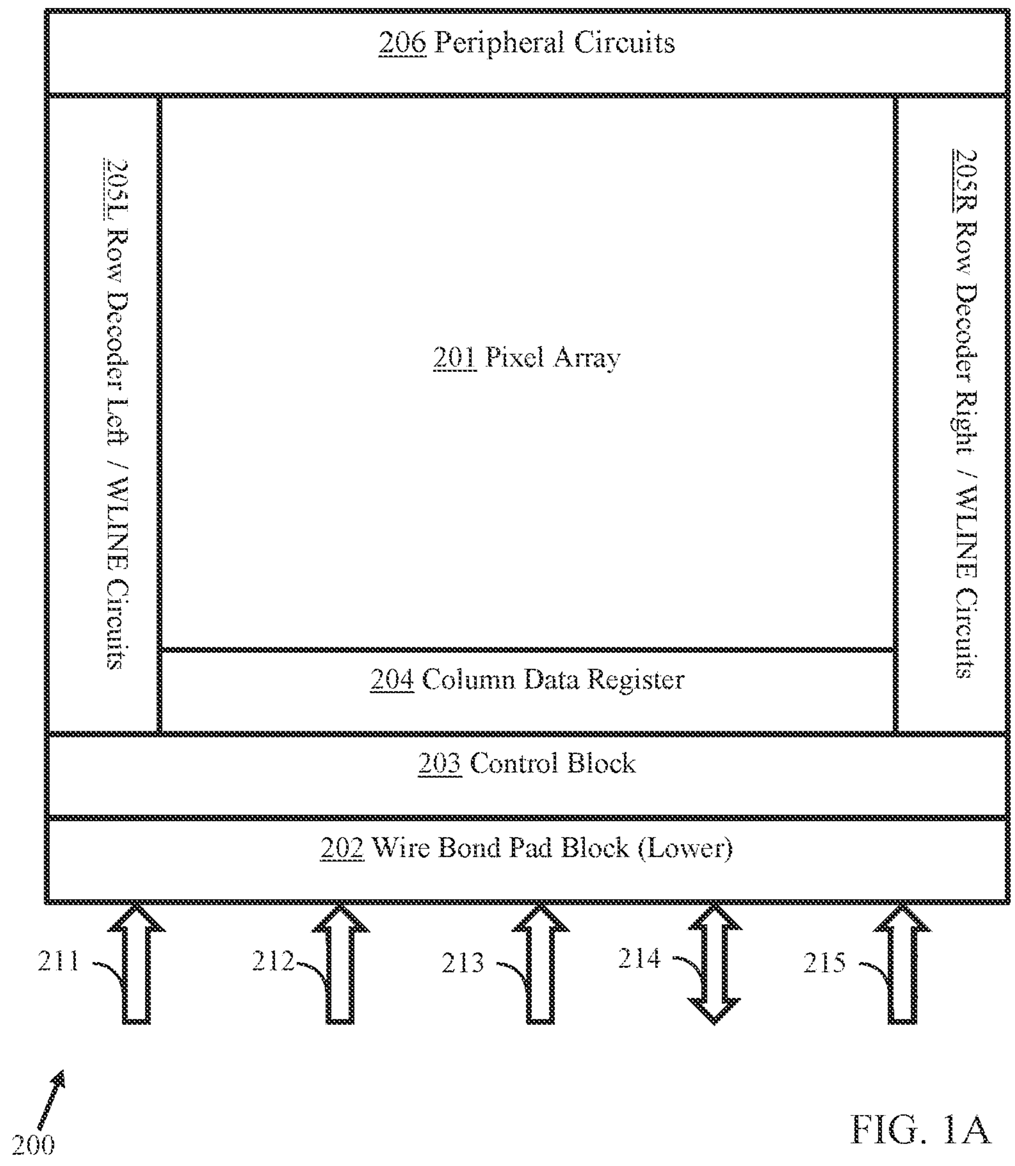
FIG. 1A is a diagram of the layout of a backplane for an array of pixel drive circuits

The present application deals with binary data used for pulse width modulation. One difficulty with pulse width modulated display of the type disclosed is transport delay. This problem is exacerbated when the physical size of the display is large and the voltage requirements dictate the use of older processes that use aluminum wiring for interconnects rather than copper. The sheet resistance of aluminum is higher than that of copper. Applicant has designed a backplane with an array of pixel drive circuits extending 26.624 millimeters laterally and 15.769 millimeters vertically and comprising in excess of 10,000,000 individual pixel drive circuits. The physical extent of the array and the number of hardware drive circuits has dictated the development of innovative solutions in order to get the required speed out of the backplane.

In the present application, Applicant discloses innovations that permit the backplane to operate at a higher effective clock frequency than might otherwise be possible. The key to the innovations is the interface to the memory cells present in each of the pixel drive circuits. Applicant uses 6-transistor SRAM type memory cells as disclosed herein as the memory basis for a variety of backplanes for different applications. The same memory addressing structure may be used for emissive arrays using devices such as μLEDs and for liquid crystal devices. In both cases the memory cell serves to turn each of the pixel drive circuits on or off in order to provide pulse width modulation to the output of the pixel drive circuit. The backplanes also retain a row addressing feature that enables the writing of data to rows that are not adjacent to each other with arbitrary spacings. This enables the development of sophisticated modulation patters that create gray scale in a relatively efficient manner.

This modulation capability is disclosed in detail in U.S. patent application Ser. No. 10/435,427, Modulation Scheme for Driving Digital Display Systems," Hudson et al, now U.S. Pat. No. 8,421,828, and in its two continuations, U.S. patent application Ser. No. 13/790,120, now U.S. Pat. No. 9,583,031 and U.S. patent application Ser. No. 15/408,869, now U.S. Pat. No. 9,824,619, the contents whereof are incorporated herein by reference.

Because this invention relates to the writing of data to a memory cell forming a part of a pixel drive circuit, those of ordinary skill in the art will recognize that this invention applies to all applications in which a memory cell forms a component of a pixel drive circuit and is not restricted to a particular type of display. Applicant has long provided backplanes for LCOS applications comprising pixel drive circuits that each include an SRAM memory cell. Additional array of pixel applications using an SRAM memory cell include a family of digital micromirror devices, marketed by Texas Instruments under the DLP™ label. The present invention can be used for any of these applications or for other, similarly situated, devices.

In a current technology spatial light modulator comprising an array of pixel drive circuits, the columns may be divided into substantially equal halves, wherein each row possesses two Word Lines (WLINES) wherein one of the two word lines is addressed from one side of the array and the other word line is addressed from the opposite side of the array. The time required for a word line that is pulled high to propagate across the array of pixels is a function of the RC characteristics of the word line.

The resistance of a word line is dominated by the sheet resistance of the line and the line's length. The sheet resistance is a function of the material used to make the word line and the thickness of the line. Copper has lower sheet resistance than an aluminum wire of the same dimensions, and an aluminum wire has lower sheet resistance than a polysilicon wire of the same dimensions.

Although common practice is to use the number 1 to indicate an on state and the number 0 to indicate an off state, this convention is arbitrary and may be reversed, as is well known in the art. Similarly, the use of the terms high and low to indicate on or off is arbitrary and, in the area of circuit design, misleading, because p-channel FET transistors are in a conducting state (on) when the gate voltage is low and in a nonconducting state (off) when the gate voltage is high. The use of the word binary means that the data represents one of two states. Commonly the two states are referred to as on or off. It does not mean that the duration in time of binary elements of data is also binary weighted. In emissive displays as those of the present invention, it is often possible for a pixel of the emissive display to achieve an off state that is truly off, in that no noticeable residual leakage of light from that pixel occurs when the data state of the circuit driving a pixel of the emissive device is placed to off.

The term conductor shall mean a conductive material, such as copper, aluminum, or polysilicon, operative to carry a modulated or unmodulated voltage or signal. The word wire shall have the same meaning as the term conductor. The word terminal shall mean a connection point to a circuit element. A terminal may be a conductor or a node or other construct.

In the present application, the preceding general description and the following specific description are exemplary and explanatory only and are not restrictive of the invention as claimed. It should be noted that, as used in the specification and the appended claims, the singular forms "a", "an" and "the" include plural referents unless the context clearly dictates otherwise. Thus, for examples, reference to a material may include mixtures of materials; reference to a display may include multiple display, and the like. Use of the word display is synonymous with the term array of pixels as well as other similar terms. A display need not be used as a means for presenting information for human viewing and may include an array of pixels for any use. All references cited herein are hereby incorporated by reference in their entirety, except to the extent that they conflict with teachings explicitly set forth in this specification. The terms MOSFET transistor, FET transistor, FET and transistor are considered to be equivalent. All transistors described herein are MOSFET transistors unless otherwise indicated. Those of skill in the art will recognize that equivalent circuits may be created in nMOS silicon or pMOS silicon.

These and other objects and advantages of the present invention will no doubt become obvious to those of ordinary skill in the art after having read the following detailed description of the preferred embodiments, which is illustrated in the various drawing figures.

FIG. 1A presents a typical backplane 200 for an array of pixel drive circuits. The pixel drive circuits may supply a modulated current to drive an emissive array, such as an array of μLED elements or a modulated voltage to drive a liquid crystal cell. FIG. 1A presents a diagram of the data transfer sections and selected external interfaces of spatial light modulator (SLM) 200. SLM 200 comprises pixel drive circuit array 201, left row decoder and word line circuit 205L, right row decoder and word line3 circuit 205R, column (bit line) data register array 204, control block 203, and wire bond pad block 202 (lower) Column (bit line) data register 204 comprises a collection of bit line drivers, wherein each bit line driver comprises a memory element or memory cell and associated circuitry to assert the data state of the memory element on the bit line most likely in the case of a DRAM type memory or on complementary bit lines most likely in the case of an SRAM type memory. The memory element or memory cell of a bit line driver does not need to be a fully function memory cell such as that shown in FIG. 1D because the contents are only used to hold the memory state intended to be written to a memory element such as that of FIG. 1D. Wire bond pad block 202 is configured so as to enable contact with an FPCA or other suitable connecting means so as to receive data and control signals over lines from an SLM controller (not shown.) The data and control signal lines for lower wire bond pad block 202 comprise clock signal line 211, op code signal lines 212, serial input-output signal lines 213, bidirectional temperature signal lines 214, and parallel data signal lines 215.

Wire bond pad block 202 receives image data and control signals and moves these signals to control block 203. Control block 203 receives the image data and routes the image data to column data (bit line) register array 204. Row address information is routed to row decoder and word line circuit left 205L and to row decoder and word line circuit right 205R. In one embodiment, the value of op code signal lines 212 determines whether data received on parallel data signal lines 215 is address information indicating the row to which data is to be loaded or data to be loaded to a row. In one embodiment the row address information acts as header, appearing first in a time ordered sequence, to be followed by data for that row. In the context of the present application, the word "address" is most often a noun used to convey the location of the row to be written. The location may be conveyed as an offset from the location (address) of a baseline row or it may be an absolute location of the row to be written. This is similar to the manner in which a Random-Access Memory device, such as an SRAM, is written or read. The use of column addressing, also used in Random-Access Memory devices, may be envisioned, but other mechanisms, such as a shift register, are also envisioned. Use of a shift register to enable the writing of data to rows of the array is also envisioned.

Row decoder left 205L and row decoder right 205R are configured to pull the word line for the decoded row high so that data for that row may be transferred from column data (bit line) register array 204 to the memory storage elements resident in the pixel cells of that row of pixel array 201. In one embodiment, row decoder and word line circuit left 205L pulls the word line high for a left half of the display, and row decoder and word line circuit right 205R pulls the word line high for a right half of the display.

One characteristic of a display used for human viewing is that, in most instances, the pixels of the array of a display must be contiguous to each other. There are a few limited exceptions where special optics is used to create a contiguous image from non-contiguous sections of a display or from separate displays, each displaying a portion of the final image. The present invention is directed to those cases where the pixels of the array are contiguous in the same manner as a liquid crystal display (LCD) used as a monitor or as a part of a portable notebook computer.

Figure 1B:
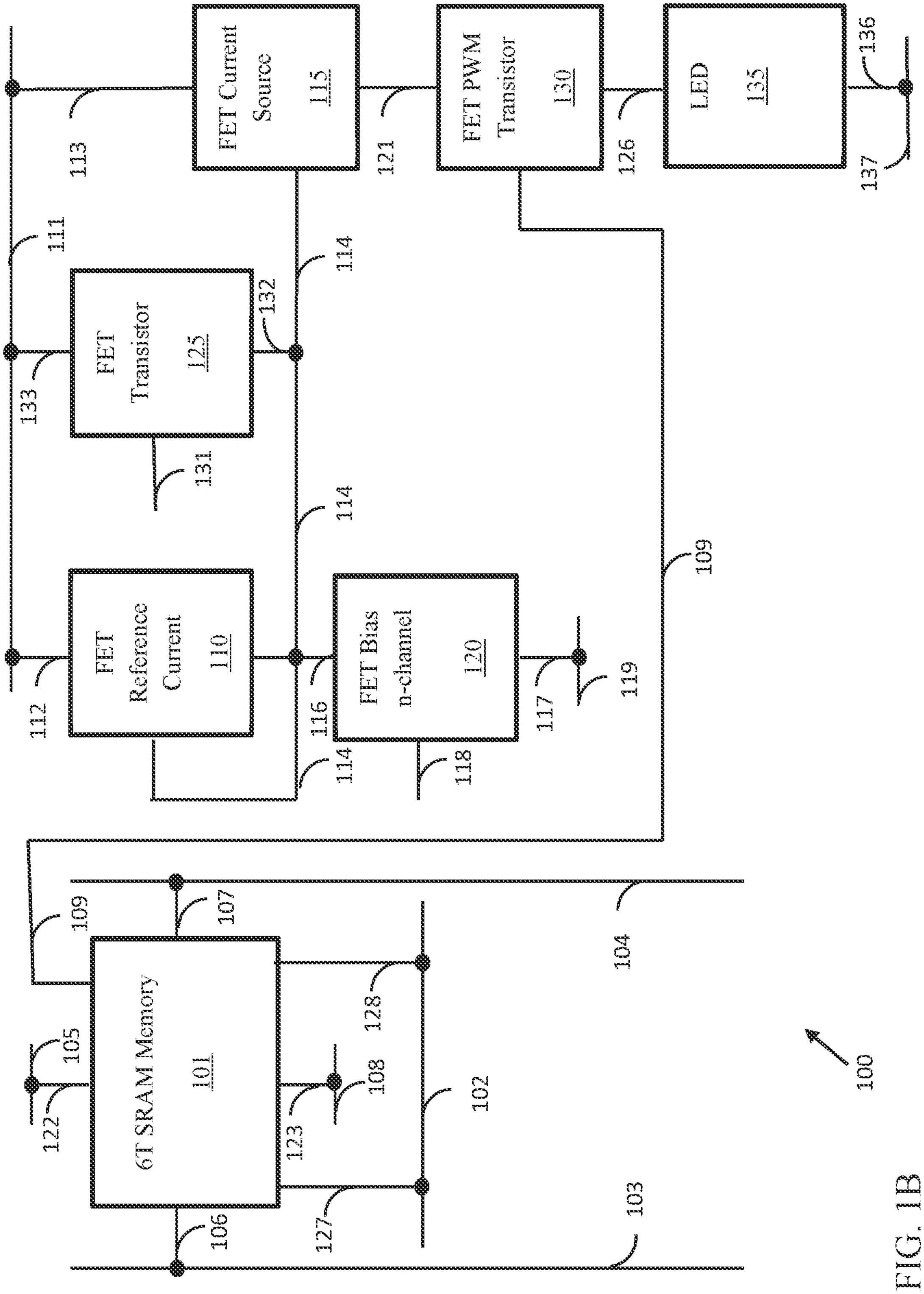
FIG. 1B is a block diagram of a current source pixel drive circuit able to drive individual emissive pixel elements in a pulse width modulated manner.

FIG. 1B presents block diagram 100 of a current mirror pixel drive circuit of an array of emissive pixels. Pixel circuit 100 comprises SRAM memory cell 101, a current mirror source comprising MOSFET transistors 110, 115, and 120, FET 125 operative to shut current source FET 115 off when pulled high and a data modulation section comprising MOSFET transistor 130 operative to pulse-width modulate the output of the drain of FET 130 in order to impose gray scale on LED 135 associated with that pixel. The data state of the SRAM memory cell 101 is asserted onto the gate of data modulation FET 130, thereby largely determining the state of pixel drive circuit 100. SRAM memory cell 101 is depicted as a 6-T (6 transistor) cell although the use of other SRAM memory cells with different numbers of transistors is anticipated. In this instance only one of the complementary outputs of the SRAM memory cell is required. The choice between $S_{POS}$ and $S_{NEG}$ depends on the design of the remainder of the pixel drive circuit.

SRAM memory cell 101 is connected to word line (WLINE) 102 by conductors 127 and 128. Complementary data lines ($B_{POS}$) 103 and ($B_{NEG}$) 104 connect to SRAM memory cell 101 by conductors 106 and 107 respectively. When WLINE 102 is pulled high, pass transistors in the memory cell allow new data to be stored in the memory cell. Data output $S_{NEG}$ of SRAM 101 is asserted over conductor 109 onto the gate of PWM FET transistor 130. Operation of the 6T SRAM memory is explained in detail in FIG. 1D and its associated text.

MOSFET transistors 110, 115, 120, 125, and 130 form a circuit operative to deliver a pulse-width modulated drive waveform to LED 135 driven by the pulse width modulated waveform at required voltage and current levels. FET transistors 110 and 120 form a reference current source operative to provide a reference current to the gate of transistor 115 at a required voltage. MOSFET transistor 110 sets the reference current $I_{REF}$ and MOSFET transistor 120 sets the voltage for the reference current on conductors 114 and 116. MOSFET transistor 120 is a large L FET designed to operate as a variable resister based on a bias voltage $V_{BIAS}$ applied to its gate over conductor 118. In one embodiment, $V_{BIAS}$ is set externally and, in one embodiment, is supplied to all pixel circuits. In one embodiment the gate of BIAS FET 120 is connected to $V_{SS}$. The source of FET 120 is connected to conductor 119 by conductor 117. Conductor 119 is connected to voltage $V_{SS}$. In one embodiment, the stable reference current asserted onto conductor 114 is supplied to a plurality of pixel drive circuits. In one embodiment, the stable reference current is asserted onto the gate of its own current source FET 115 and onto the gates current sources of pixels forming a contiguous block of pixels.

Current source FET 115 is operative to receive a stable reference current at its gate over conductor 114 and mirror that current. The source of FET 115 is connected over conductor 113 to conductor 111, which supplies voltage V_H. The drain of current mirror FET 115 asserts a stable current over conductor 121, wherein the stable current may differ from the reference current. To achieve the desired current at the drain of FET 115, FET 115 must be designed to deliver that. FET 115 is preferably a large L FET, wherein the relationship between the length (L) and the width (W) is selected in order to achieve the desired current at its drain. The desired current asserted on the drain of FET 115 may differ from the reference current received on the gate of FET 115, depending on the design W/L ratio of FET 115. Different W/L designs may be required for pixels of different colors.

FET 125 acts as a modulation element on the output of current mirror FET 115. The gate of FET 125 receives a signal 1_off from an external modulation element. The source of FET 125 is connected to conductor 111 by conductor 133, which asserts V_H onto the source of FET 125. If 1_off is low then FET asserts V_H minus a small threshold voltage onto its drain, whereupon the substantially V_H voltage acts upon the gate of current mirror FET 125 to take FET 115 out of saturation mode. This results in FET 115 no longer acting as a current mirror. This enable signal 1_off to act as a form of non-data modulation control signal. The action of 1_off is to raise or lower the overall duty cycle of the modulation output of pixel circuit 100, thereby controlling its intensity without regard for the data state of the SRAM cell.

FET 130 comprises a data modulation section suitable to respond to pulse-width modulation waveforms used to create gray scale modulation. The value of this function is well understood in the art. The output of the drain of FET 115 is asserted onto the source of FET 130 over conductor 121. The gate of PWM modulation FET 130 is connected to output $S_{NEG}$ of SRAM 101 over conductor 109. When the data state of SRAM 101 is on, then $S_{NEG}$ is low and acts on the gate of PWM modulation FET 130 to enable it to assert the current asserted onto its source over conductor 121 onto its drain over conductor 126.

The output of the drain of PWM modulation FET 130 is asserted onto conductor 126. The output comprises a pulse width modulated signal operative to create a gray scale modulation at a desired intensity. The output is connected over conductor 126 to the anode of an emissive device such as LED 135. The cathode of LED 135 is connected by terminal 136 to V_L asserted onto conductor 137. The voltage level of V_L is lower than V_H and may be lower than $V_{SS}$ and may be a negative voltage.

In order to avoid aliasing caused by the operating rate of 1_off should create pulse intervals that is shorter than the shortest pulse duration imposed on S_neg by a substantial margin, perhaps a factor of 10 to 1 in order to avoid aliasing. In some non-display applications, the issue of aliasing may be less important. In that case the pulse interval of 1_off may correspond to tens or more of lsb internals. In one embodiment operation of 1_off is synchronized with operation of S_neg.

Figure 1C:
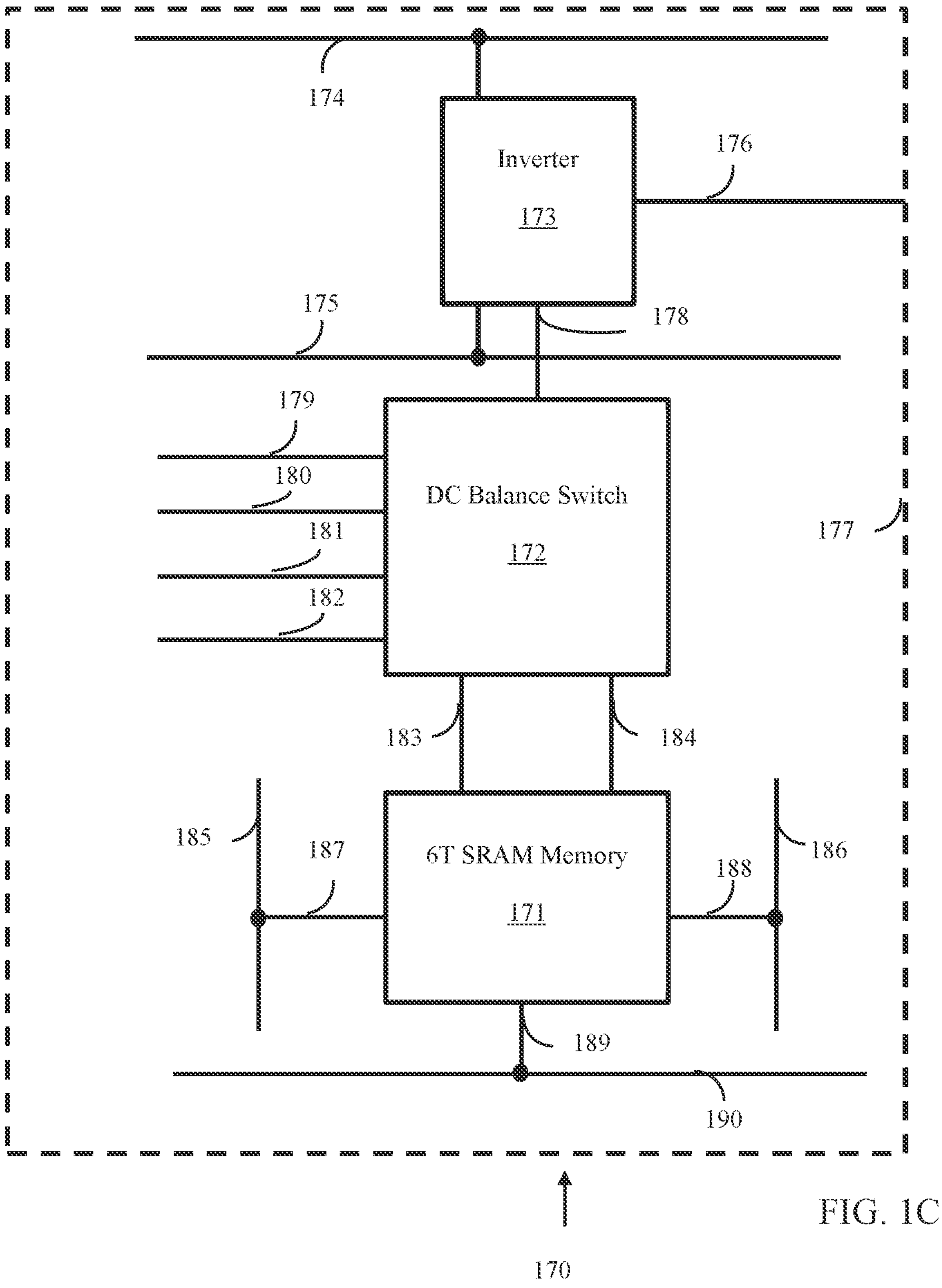
FIG. 1C depicts a pixel drive circuit configured to drive a nematic liquid crystal device.

FIG. 1C depicts the block diagram of a liquid crystal on silicon (LCOS) pixel circuit 170. The circuit is taken from U.S. patent application Ser. No. 10/413,649, Hudson, Pixel Cell Design with Enhanced Voltage Control, now U.S. Pat. No. 7,443,374, the contents whereof are incorporated herein by reference. The pixel circuit comprises SRAM memory cell 171, DC Balance Switch 172, Inverter 173, and pixel mirror/electrode 177.

Data to be loaded onto SRAM memory cell 171 is loaded onto complementary bit lines $B_{POS}$ 185 and $B_{NEG}$ 186. Complementary bit lines 185 and 186 are asserted onto SRAM memory cell 171 over terminals 187 and 188. When word line 190 is held high, its state is asserted onto pass transistors (not shown) over terminal 189, that allow the memory state to be changed or not changed, depending on the data present on complementary bit lines 185 and 186. The output of the SRAM is asserted on complementary outputs $S_{POS}$ 183 and $S_{NEG}$ 184 with values determined by the memory state stored on the SRAM.

The values asserted on $S_{POS}$ 183 and $S_{NEG}$ 184 are applied to DC balance switch 172. Each connects to a pass gate within the DC balance switch DC balance switch 172 asserts one of the values on $S_{POS}$ 183 or $S_{NEG}$ 184 depending on its state onto terminal 178. The state of DC balance switch 172 depends on the control signals asserted on control signal lines 179, 180, 181, and 182, which are operative to turn on a first pass gate and turn off the second pass gate. Thus one of the signal on $S_{POS}$ 183 and the signal on $S_{NEG}$ 184 is asserted onto terminal 178.

The signal asserted onto terminal 178 is applied to inverter 173, which selects one of the voltage on conductor 174 and the voltage on conductor 175 to its output on terminal 176. In this embodiment, inverter 173 comprises a p-channel FET (not shown) with its source connected to the voltage on conductor 174 and an n-channel FET (not shown) with its source connected to the voltage on conductor 175. Terminal 178 is tied to the gates of both FETs and the drains of both FETs are connected to terminal 176.

As a result, the voltage on conductor 174 must exceed the voltage on conductor 175, by a degree determined by the design of the FETs. If the voltage asserted on terminal 178 is low, then the p-channel FET will be turned on and the n-channel FET will be turned off and the voltage on terminal 176 will be the voltage found on conductor 174. If the voltage asserted on terminal 178 is high, then the p-channel FET will be turned of and the n-channel FET will be turned on, thereby asserting the voltage on conductor 175 onto terminal 176. Terminal 176 asserts its voltage onto pixel mirror electrode 177.

DC balance switch 172 operates in conjunction with a separate voltage switching the voltage on the common plane of the liquid crystal cell to achieve DC balance. This is carefully explained in U.S. Pat. No. 7,443,374, as previously noted.

Figure 1D:
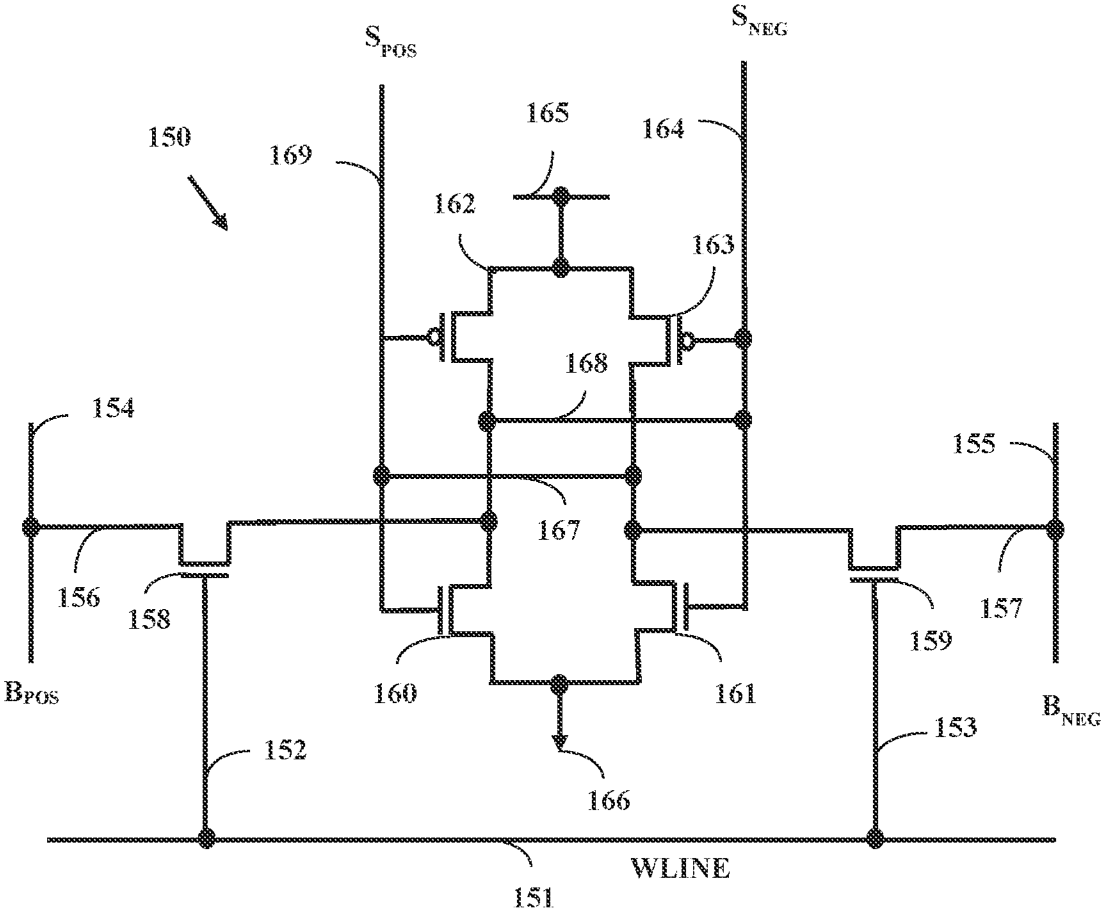
FIG. 1D depicts a schematic drawing of a 6 transistor SRAM memory cell used in a pixel drive circuit.

FIG. 1D shows a preferred embodiment of a storage element 150. Storage element 150 is preferably a CMOS static ram (SRAM) latch device. Such devices are well known in the art. See DeWitt U. Ong, Modern MOS Technology, Processes, Devices, & Design, 1984, Chapter 9 5, the details of which are hereby fully incorporated by reference into the present application. A static RAM is one in which the data is retained as long as power is applied, though no clocks are running FIG. 1D shows the most common implementation of an SRAM cell in which six transistors are used. FET transistors 158, 159, 160, and 161 are n-channel transistors, while FET transistors 162, and 163 are p-channel transistors. In this particular design, word line WLINE 151, when held high, turns on pass transistors 158 and 159 by asserting the state of WLINE 151 onto the gate of pass transistor 158 over conductor 152 and onto the gate of pass transistor 159 over conductor 153, allowing ($B_{POS}$) 154, and ($B_{NEG}$) 155 lines to remain at a pre-charged high state or be discharged to a low state by the flip flop (i.e., transistors 162, 163, 160, and 161). The potential on $B_{POS}$ 154 is asserted onto the source of pass transistor 158 over conductor 156, and the potential on $B_{NEG}$ 155 is asserted onto the source of pass transistor 159 over conductor 157. The drain of pass transistor 158 is asserted onto the drains of transistors 160 and 162 and onto the gates of transistors 161 and 163 over conductor 168 while the drain of pass transistor 159 is asserted onto the drains of transistors 161 and 163 and onto the gates of transistors 160 and 162 over conductor 167. Differential sensing of the state of the flip-flop is then possible. In writing data into the selected cell, ($B_{POS}$) 154 and ($B_{NEG}$) 155 are forced high or low by additional write circuitry on the periphery of the array of pixel circuits. The side that goes to a low value is the one most effective in causing the flip-flop to change state. In the present application, one output port 164 is required to relay to circuitry in the remainder of the pixel circuit whether the data state of the SRAM is in an "on" state or an "off" state. The signal output in this case is $S_{NEG}$, asserted onto conductor 164, meaning that when the data state of storage element 150 is high or on, the output of storage element 150 is low. As will be shown regarding FIG. 2C, $S_{NEG}$ is asserted onto the gate of a p-channel FET, causing it to conduct.

SRAM circuit 150 is connected to $V_{DDAR}$ by conductor 165 and to $V_{SS}$ by conductor 166. $V_{DDAR}$ denotes the $V_{DD}$ for the array. It is common practice to use lower voltage transistors for periphery circuits such as the I/O circuits and control logic of a backplane for a variety of reasons, including the reduction of EMI and the reduced circuit size that this makes possible.

The six-transistor SRAM cell is desired in CMOS type design and manufacturing since it involves the least amount of detailed circuit design and process knowledge and is the safest with respect to noise and other effects that may be hard to estimate before silicon is available. In addition, current processes are dense enough to allow large static RAM arrays. These types of storage elements are therefore desirable in the design and manufacture of liquid crystal on silicon display devices as described herein. However, other types of static RAM cells are contemplated by the present invention, such as a four transistor RAM cell using a NOR gate, as well as using dynamic RAM cells rather than static RAM cells.

The convention in looking at the outputs of an SRAM is to term the outputs as complementary signals $S_{POS}$ and $S_{NEG}$. The output of memory cell 150 connects the gate of transistors 163 and 161 over conductor 164 to circuitry (not shown) operative to receive the output of memory cell 150. By convention this side of the SRAM is normally referred as S_neg or $S_{NEG}$. The gates of transistors 162 and 160 are normally referred to as $S_{POS}$. Either side can be used provided circuitry, such as an inverter, is added where necessary to insure the proper function of the transistor receiving the output data state of the memory cell.

Figure 2A:
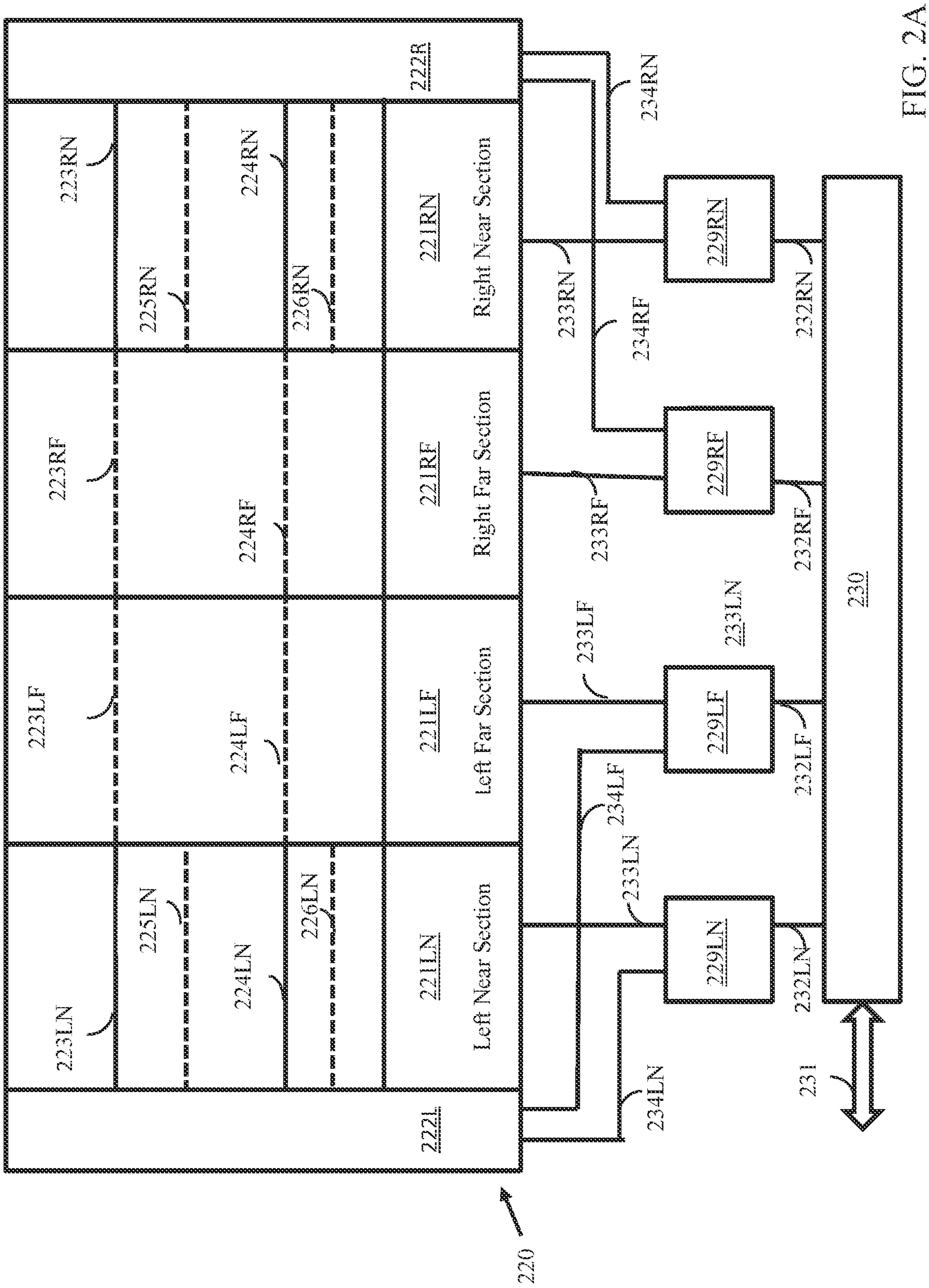
FIG. 2A is a block diagram of an arrangement of word lines on a backplane divided into four vertical sections each modulated by a different display controller.

FIG. 2A depicts an arrangement whereby four controller devices 221LN, 221LF, 221RF and 221 RN control a single backplane 220. The array of pixel drive circuits of backplane 220 is divided into four vertical sections, each of which has a controller associated with it. The descriptive convention for this application is that LN means left near, LF means left far, RF means right far, and RN means right near. The use of near and far means the relative distance to the row address circuitry found in left row decoder and word line driver 222L or the relative distance to the row address circuitry found in right row decoder and word line driver 222R.

The vertical sections comprise left near independent section of pixel drive circuits 221LN, left far independent section of pixel drive circuits 221LF, right far independent section of pixel drive circuits 221RF, and right near independent section of pixel drive circuits 221RN, hereafter referred to as sections. It is possible to make the width of the sections 221LN, 221LF, 221RF and 221RN substantially equal, but it is not strictly necessary that the vertical sections be substantially or exactly equal. Engineering considerations may dictate that they not all be equal. It is also possible to make the width of the left side sections combining 221LN and 221LF not equal to the width of the right side sections combining 221RN and 221RF for engineering reasons.

Complete image data for the array of pixel drive circuits is received by image data preprocessor 230 over bus 231. Image data preprocessor 230 processes the incoming image data to separate it into data for left near section 221LN, left far section 221LF, right far section 221RF and right near section 221RN and delivers that data to display controller 229LN, display controller 229LF, display controller 229RF and display controller 229RN over terminals 232LN, 232LF, 232RF, and 232RN respectively. Display controller 229LN, display controller 229LF, display controller 229RF, and display controller 229RN process the data and schedules it to be written to the required row. All display controllers 229LN, 229F, 229RF, and 229RN and preprocessor 230 operate on the same master clock set by a crystal controlled circuit (not shown) or similar devices. This does not keep them precisely synchronized because each display controller synchronizes to the master clock signal with its individual digital phase lock loop which will run slightly asynchronous to the other digital phase lock loops. Each display controller also receives a Vsync (vertical synchronization) signal from circuitry associated with image data preprocessor 230. Vsync will keep the frame rate of each image section in sync with the frame rates of all other image sections. They will normally be within a clock cycle or two, which has negligible effect on image quality between vertical sections.

In one embodiment, the data transferred to the column data registers by each display controller is not limited to the boundaries of each independent segment of pixel drive circuits with which is associated through the row select assembly.

There are other methods of developing and implementing a display controller assembly. In one approach, all required display controllers are designed and implemented in a single semiconductor device. This may make some aspects easier to implement, but the federated approach presented herein offers some advantage with respect to yield due to the smaller silicon size for the individual display controllers. Also, the striped display approach to the backplane is compatible with either approach to the display controller.

A device termed as a single display controller or display controller assembly wherein each display controller controls a section of a display may be comprised of a number of separate elements, such as multiple semiconductor devices, within the spirit of this invention.

Row decoder and word line driver 222L comprises a pair of row decoders and word line drivers; one for display controller 229LN and one for display controller 229LF. Display controller 229LN delivers word line address and a row trigger control signal over line 234LN to row decoder and word line driver 222L. At the same time display controller 229LN delivers image data for the addressed row onto a set of bit line drivers over conductor 233LN for left near section 221LN (not shown.) The relative timing requires that data for all pixel drive circuits of the addressed row be in place before the word line driver pulls the word line for that segment of the row high. Propagation delay can be taken into account as long as the propagation rates across the display and up the display insure that the complementary bit lines for that column are in their data state at that row before the word line pulls high at that point on the row.

Display controller 229LF delivers word line address and a row trigger signal over line 234LF to the second of two row decoder and word line driver circuits in row decoder and word line drive 222L. At the same time display controller 229LF delivers image data for the addressed row onto a set of bit line drivers over conductor 233LF. The same considerations for propagation delay addressed for display controller 229LN apply to display controller 229LF.

Row decoder and word line driver 222R comprises a pair of row decoder and word line driver circuits after the circuits of row decoder and word line driver 222L. Display controller 229RF delivers word line address and a row trigger signal over line 234RF to one of a pair of row decoder and word line driver circuits in row decoder and word line driver 222R. Display controller 229RF delivers image data for right far section 221RF to the bit line drivers over conductor 233RF with the previously noted timing conditions.

Display controller 229RN delivers word line address and a row trigger signal over line 234RN to the second of two row decoder and word line driver circuits in row decoder and word line drive 222R. Display controller 229RN delivers image data for right near section 221RN over conductor 233RN with the previously noted timing conditions.

When row decoder and word line driver 222L receives a row address from display controller 229LN on a first row decoder and word line driver circuit, the row corresponding to the address is held high when a trigger signal is received over the same connection. Dashed line 225LN represents a word line for a first row of near left section 221LN and dashed line 226LN represents a word line for a second row of near left section 221LN. Because section 221LN is near to row decoder and word line driver, word line 225LN and word line 226LN do not extend into left far section 221LF. For reasons of constant metal density, a dummy metal structure may be positioned in left far section 221LF to improve the planarity of the die forming the backplane, a consideration of importance for liquid crystal and other devices.

When row decoder and word line driver 222L receives a row address from display controller 229LF on a second row decoder and word line driver circuit, the row corresponding to the address is held high when a trigger signal is received over the same connection. Word line 223LN passes under left near section 221LN without making electrical connection and reaches word line 223LF, which is connected to the SRAM memory cells of each pixel drive circuit in left far section 221LF. Identical considerations hold true for word line segments 224LN and 224LF.

The RC value of word line 223LN combined with word line 223LF will be greater than the RC value of 226LN because of the resistance associated with the length of 224LN that passes under left near section 221LN, although, if the sections are not of equal width, that must also be taken into account. The RC characteristic is part of the definition of transport delay in propagating the change in the word line from low to high and back to low.

Similar considerations apply in the case of word line 225RN and 226RN, which both connect to a row of pixel drive circuits in right near section 221RN. Likewise, word line 223RN passes under right near section 221RN in order to connect to word line segment 223RG, which connects to SRAM memory cells in pixel drive circuits forming a row of right far section 221RF. The same consideration applies to word line segment 224RN which connects to word line segment 224RF.

Figure 2B:
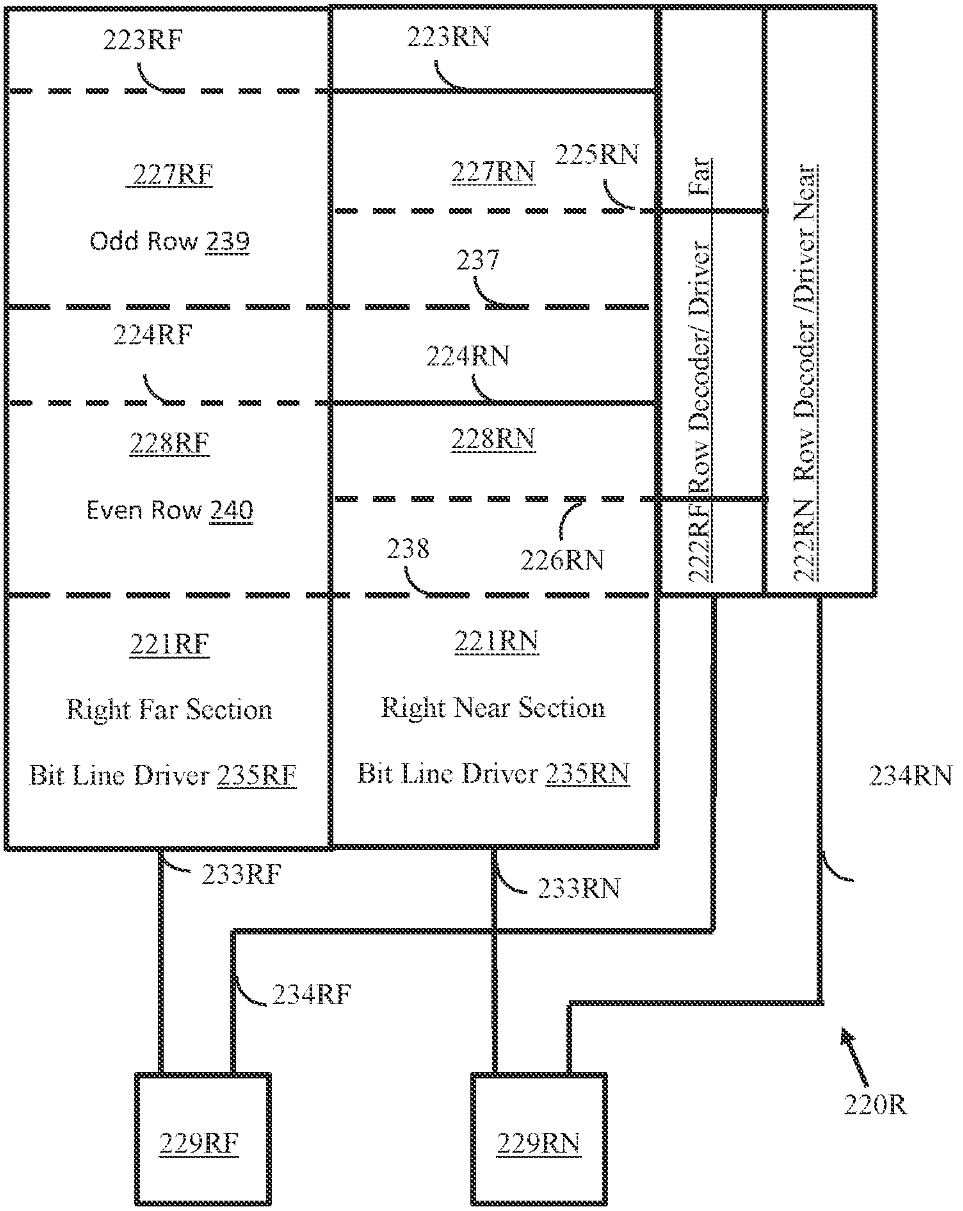
FIG. 2B is a block diagram of the right side of the block diagram of FIG. 2A with added detail.

FIG. 2B presents a more detailed block diagram view of parts of the right half of the system of FIG. 2A. The expanded view comprises display controller 229RF, display controller 229RN, and partial backplane 220R. Partial backplane 220R comprises right far section 221RF, right near section 221RN, row decoder and word line driver (right far section 222RF), and row decoder and word line driver (right near section) 222RN. The relative positions of row decoder and word line driver 222RF and of row decoder and word line driver 222RN is selected for ease of explanation. They may in fact be developed in different layers and stacked vertically, depending on the number of metal layers of the backplane semiconductor. Other arrangements are possible.

Right far section 221RF comprises bit line driver 235RF, even row pixel drive circuit 228RF and odd row pixel drive circuit 227RF. Right near section 221RN comprises bit line drive circuit 235RN, even row pixel drive circuit 228RN and odd row pixel drive circuit 227RN. Odd row 239 comprises pixel drive circuit 227RF and pixel drive circuit 227RN, and even row 240 comprises pixel drive circuit 228RF and pixel drive circuit 228RN. For clarity, dashed line 237 represents the boundary between the pixel driver circuits of odd row 239 and the pixel driver circuits of even row 240. Dashed line 238 represents the boundary between the pixel driver circuits of even row 240 and bit line driver 235RF and bit line driver 235RN.

Display controller 229RF delivers image data to bit line driver 235RF over conductor 233RF. Conductor 233RF comprises a substantial plurality of parallel data paths. Display controller 229RF sends row address information to row decoder and word line driver 222RF over conductor 234RF. In one embodiment, a separate trigger signal is sent over conductor 234RF to pull the word line high when timing is important. This can be implemented using an AND gate (not shown) with two input ports and one output. The selected row receives one input from the row decoder and the second from the trigger signal and the output is connected to the word line. Only one AND gate will have a high input on both input ports, which will result in the output of the AND gate pulling the word line high.

Digital controller 229RN delivers image data to bit line driver 235RN over conductor 233RN. Conductor 233RN comprises a substantial plurality of parallel data paths. Display controller 229RN sends row address information to row decoder and word line driver 222RN over conductor 234RN. In one embodiment, a separate trigger signal is sent over conductor 234RN to pull the word line high when timing is important. This can be implemented using an AND gate with two input ports and one output. The selected row receives one input from the row decoder and the second from the trigger signal and the output on the word line. Only one AND gate will have a high input on both input ports, which will result in the output of the AND gate pulling the word line high.

Pixel drive circuit 227RF is the portion of odd row 239 that lies in right far section 221RF. In practical embodiments, right far section 221RF may comprise 500 to 1000 pixel drive circuits or more, although other number of pixel driver circuits are not excluded. Similar considerations may be applied to pixel drive circuit 227RN, pixel drive circuit 228RF and pixel drive circuit 228RN.

Row decoder and word line driver far 222RF is operative to drive two word lines sets in each row. Word line segment 223RN passes under pixel drive circuit 227RN of odd row 239 to connect to word line segment 227RF where it makes contact with the SRAM memory cell of pixel drive circuit 227RF. Row decoder and word line driver near 222RN drives word line segment 225RN which makes contact with the SRAM memory cell of pixel drive circuit 227RN.

Row decoder and word line driver 222RF is operative to drive word line segment 224RN that passes under pixel drive circuit 228RN of even row 240 to connect to word line segment 224RF where it makes contact with the SRAM memory cell of pixel drive circuit 228RF.

In one embodiment, word line segments 223RN and 223RF and word line segment 225RN of odd row 239 are pulled high at substantially the same time with some allowance for differing propagation delays. Alternatively word line segments 224RN and 224RF and word line segment 226RN of even row 240 are pulled high at substantially the same time with some allowance for differing propagation delays. The choice of row on which the word lines are pulled high depends on the address data sent to row decoder and word line drivers 222RF and 222RN.

For display applications generating images for viewing by humans, it is best to keep the near and far sections on the same schedule. This will help control the generation of visual artifacts from such causes as lateral field effects. For other applications there may be advantages to placing the near and far sections on differing schedules.

Figure 2C:
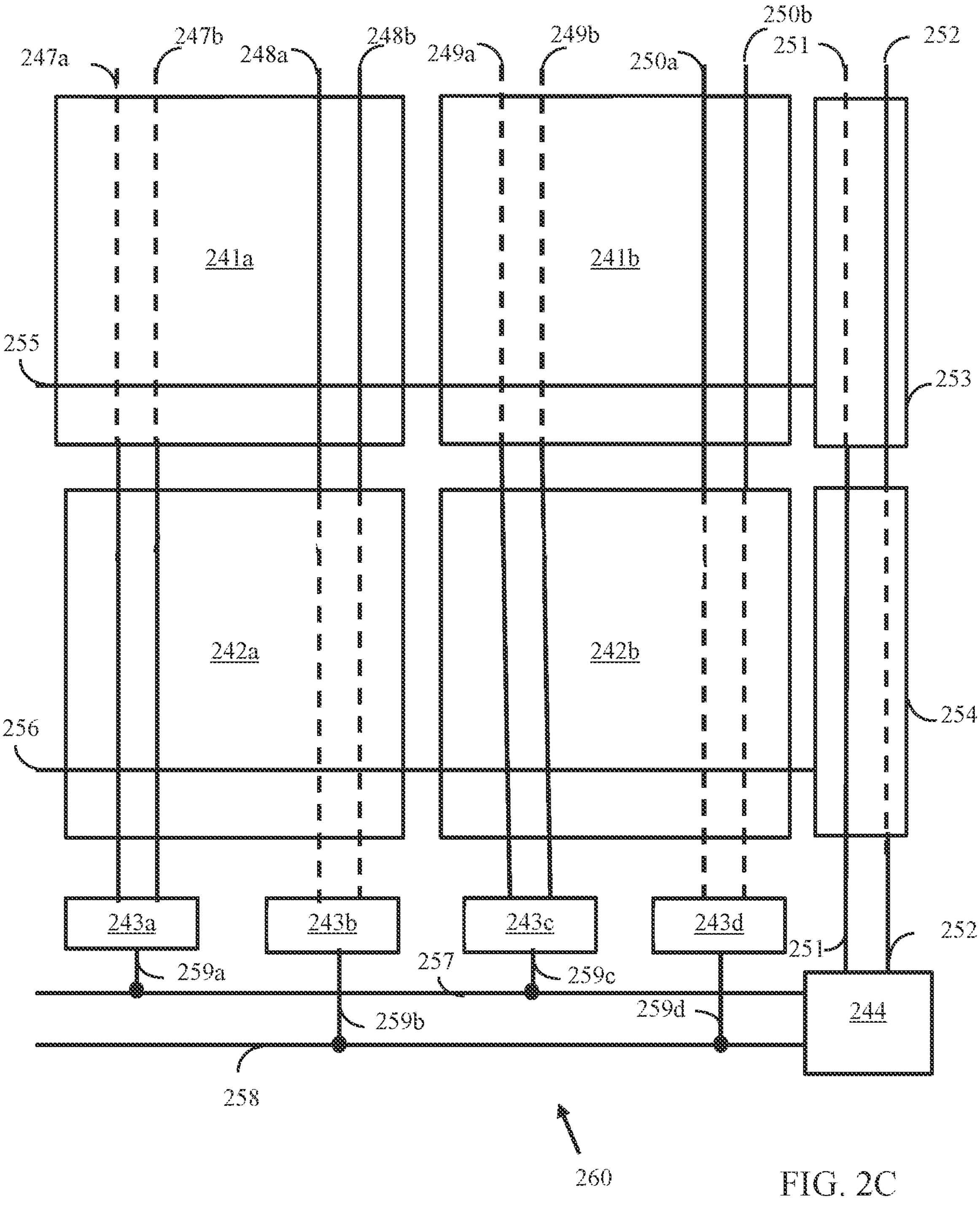
FIG. 2C is a block diagram of a 2×2 array of pixel drive circuits in which even rows and odd rows are modulated independently of each other.

FIG. 2C depicts an additional way in which the time required to write an array can be reduced. Display system 260 comprises four pixel drive circuits 241*a*, 241*b*, 242*a*, and 242*b* arranged in a 2×2 matrix format. Display system 260 further comprises row decoder and word line drivers 253 and 254, and bit line drivers 243*a*, 243*b*, 243*c* and 243*d*, and display controller 244. It is to be understood that a practical arrangement will have many more rows and columns than are depicted here.

Pixel drive circuits 241*a* and 241*b* form an odd numbered row of pixel drive circuits and pixel drive circuits 242*a* and 242*b* form an even number row of pixel drive circuits. Row decoder and word line driver 253 drives word line 255 associated with odd row pixel driver circuits 241*a* and 241*b*. Row decoder and word line drive 254 drives word line 256 associated with even row pixel driver circuits 242*a* and 242*b*.

Bit line driver 243*a* supplies complementary binary image data to the SRAM memory cell of pixel driver circuit 241*a* on an odd numbered row over complementary bit lines 247*a* and 247*b*. Bit line driver 243*c* supplies complementary binary image data to the SRAM memory cell of pixel driver circuit 241*b* on an odd numbered row over complementary bit lines 249*a* and 249*b*. Complementary bit lines 247*a* and 247*b* and complementary bit lines 249*a* and 249*b* burrow underneath pixel drive circuits 242*a* and 242*b* located on an even numbered row.

Bit line driver 243*b* supplies complementary binary image data to the SRAM cell of pixel drive circuit 242*a* on an even numbered row over complementary bit lines 248*a* and 248*b*. Bit line driver 243*d* supplies complementary binary image data to the SRAM memory cell of pixel drive circuit 242*b* over complementary bit lines 250*a* and 250*b*. Complementary bit lines 248*a* and 248*b* and complementary bit lines 250*a* and 250*b* burrow under pixel drive circuits 241*a* and 241*b* in an odd numbered row. It is understood that further even numbered rows may be positioned above the odd numbered row of pixel drive circuits 241*a* and 241*b*.

Data for odd numbered rows is supplied to bit line drivers 243*a* and 243*c* over bus line 257 by terminals 259*a* and

259*c*. Data for even numbered rows is supplied to bit line drivers 243*b* and 243*d* over bus line 258 by terminals 259*b* and 259*d*. Bus lines 251 and 252 comprise a plurality of parallel lines used to transmit address data for the selected row to row decoder and word line drivers 253 and 254 respectively. In one embodiment, bus lines 251 and 252 comprise a word line trigger signal conductor that controls the timing of the action to pull the word line high.

Applicant has developed several backplanes of different sizes in different processes with an active resolution of 4096 columns by 2400 rows. By applying the four display controller approach as disclosed herein and also using the even row-odd row approach, the nominal size of display that each display controller subchannel must handle becomes 1024 wide by 1200 tall, which is substantially manageable. The ultimate requirement, then is for four pairs of display controller subchannels, which is effectively eight subchannels.

Delay in the propagation of data and signals in a backplane is of the utmost importance when using an older process with aluminum wiring, especially if the part is large in integrated circuit terms. Applicant is separately filing a separate patent application describing means for minimizing the delays within a backplane by speed matching the bit lines to the word line control and by speed matching the word line propagation to the bit line trigger signal.

Figure 3A:
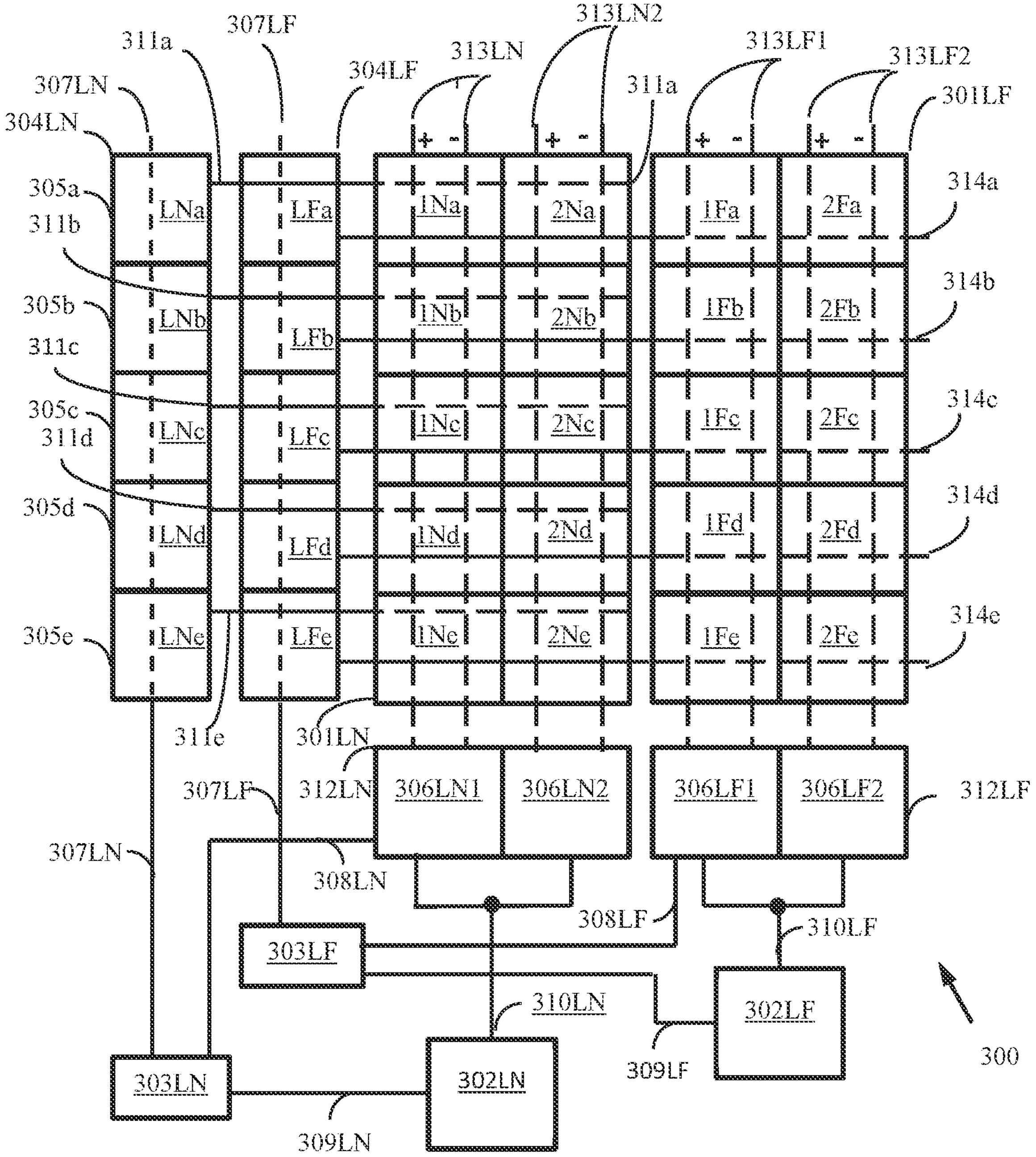
FIG. 3A is a block diagram of the left half of an array of pixel drive circuits comprising two vertical sections of pixel drive elements modulated by separate display controllers.

FIG. 3A presents a depiction of the left side of a display 300 with 4 vertical sections of pixel drive circuits. Left display side 300 comprises leftmost vertical section of pixel drive circuits 301LN and left of center vertical section of pixel drive circuits 301LF. Left display side 300 further comprises display controller 302LN operative to control vertical section of pixel drive circuits 301LN, display control 302LF operative to control vertical section of pixel drive circuits 301LF, row of bit line drivers 312LN operative to deliver complementary bit line data to the pixels of vertical section of pixel drive circuits 301LN, and row of bit line drivers 312LF operative to deliver bit line data to the pixels of vertical section of pixel drive circuits 301LF. All segments may be resident in a same physical semiconductor assembly. Left display side 300 comprises row decoder and word line driver assembly 304LN operative to drive the word line of the selected row in vertical section of pixel drive circuits 301LN and row decoder and word line drive assembly 304LF operative to drive the word line of the selected row in vertical section of pixel drive circuits 301LF.

Display controller 302LN and display controller 302LF receive row address and row data information for their respective vertical sections from an image data preprocessor such as image data preprocessor 230 of FIG. 2A. Each display controller controls its vertical section of pixel drive circuits without regard to adjacent display controllers. The display controllers are programmed to operate in a similar manner with respect to rows to be written and are synced to the same clock. As a result, the adjacent vertical sections normally operated within a few clock cycles of each other.

The image data for a given row within vertical section of pixel drive circuits 301LN is loaded by display controller 302LN onto bit line drivers 306LN1 and 306LN2 of row of bit line drivers 312LN for the pixel drive circuits of vertical section of pixel drive circuits 301LN over terminal 310LN. The pixel drive circuits associated with bit line driver 306LN1 comprise pixel drive circuits 1Na, 1Nb, 1Nc, 1Nd and 1Ne, and the pixel drive circuits associated with bit line driver 306LN2 comprise pixels drive circuits 2Na, 2Nb, 2Nc, 2Nd and 2Ne. Bit line drive 306LN1 loads the bit line data for the selected pixel onto complementary bit lines 313LN1, which are marked with a + (plus) sign or a – (minus) sign for $B_{POS}$ or $B_{NEG}$ respectively. Bit line drive 306LN2 loads the bit line data for the selected pixel onto complementary bit lines 313LN2. As before, the complementary bit lines are marked with a + sign or a – sign.

The image data for a given row with vertical section of pixel drive circuits 301LF is loaded by display controller 302LF onto bit line driver 306LF1 and 306LF2 of row of bit line drivers 312LF for the pixel drive circuits of vertical section of pixel drive circuits 301LF over terminal 310LF. The pixel drive circuits associated with bit line driver 306LF1 comprise pixel drive circuits 1Fa, 1Fb, 1Fc, 1Fd and 1Fe, and the pixel drive circuits associated with bit line drive 306LF2 comprise 2Fa, 2Fb, 2Fc, 2Fd and 2Fe. Bit line driver 306LF1 loads the bit line data for the selected pixel onto complementary bit lines 313LF1, which are marked with a + (plus) sign or a – (minus) sign for $B_{POS}$ or $B_{NEG}$ respectively. B bit line driver 306LF2 loads the bit line data for the selected pixel onto complementary bit lines 313LF2. As before, the complementary bit lines are marked with a + (plus) sign or a – (minus) sign.

Left display side 300 comprises row 305*a*, 305*b*, 305*c*, 305*d* and 305*e*, each of which comprises a left near row decoder and wordline driver in row decoder and word line driver assembly 304LN, a left far row decoder and word line drive in wordline driver assembly 304LF, two pixels in a left near vertical section and two pixels in a left far vertical section. For example, row 305*a* comprises left near row decoder and word line driver LNa, left far row decoder and word line drive driver LFa, pixel drive circuits 1Na and 2Na of left near section 301LN and pixel driver circuits 1Fa and 2Fa of left far section 301LF. Rows 305*b*, 305*c*, 305*d* and 305*e* are organized identically with their constituents.

Left display side further comprises trigger signal circuit 303LN and trigger signal circuit 303LF. Trigger signal circuit 303LN receives a signal or set of signals over bus 309LN from display controller 302LN. Trigger signal circuit 303LN releases a bit line trigger signal over bus line 308LN and row select and word line high signals over bus line 307LN. In one embodiment, trigger signal circuit 303LN forms a part of display controller 302LN. Trigger signal circuit 303LF receives a signal or set of signals from display controller 302LF over bus 309LF. Trigger signal circuit 303LF releases a bit line trigger signal over bus line 308LF and row select and word line high signals over bus line 307LF. In one embodiment, trigger signal circuit 303LF forms a part of display controller 302LF.

Row select and word line high trigger signals delivered over bus 307LN to row decoder and word line driver assembly 304LN cause the following actions to take place. The row decoder logic in one of row decoder and word line driver LNa, LNb, LNc, LNd and LNe will go high in response to the row select signals delivered to row decoder and word line driver assembly 304LN. In a first embodiment, the output of the word line driver of each row is applied to the input of a two input AND gate (not shown). The word line trigger signal is applied to the other input of each of the AND gates. Only the selected row receives an input from both the row select decoder logic and the word line trigger signal, allowing that word line to be held high by the output of the AND gate. In one embodiment, the row decoder logic pulls the word line high without the word line trigger signal.

Word line driver LNa drives word line 311*a*, which provides the word line signal to the memory circuits of pixel drive circuits 1Na and 2Na of vertical section of pixel drive circuits 301LN. Word line 311*a* does not extend into vertical section of pixel drive circuits 301LF. In like manner word line drive LNb drives word line 311*b*, which provides the word line signal to the memory circuits of pixel drive circuits 1Nb and 2Nb of vertical section of pixel drive circuits 301LN. Word line drivers LNc, LNd, and LN3 drive word lines 311*c*, 311*d* and 311*e* respectively, which provide word line signal to the memory circuits of the pixel drive circuits of their respective rows.

Row select and word line high signals delivered over bus 307LF to row decoder and word line driver assembly 304LF cause the following actions to take place. The row decoder logic in one of row decoder and word line drivers LFa, LFb, LFc, LFd and LFe will go high in response to the row select signals delivered to row decoder and word line driver assembly 304LF. In a first embodiment, the output of the word line driver of each row is applied to the input of a two input AND gate (not shown). The word line trigger signal is applied to the other input of each of the AND gates. Only the selected row receives an input from both the row select decoder logic and the word line trigger signal, allowing that word line to be held high. In one embodiment, the row decoder logic pulls the word line high without the trigger signal.

Word line driver LFa drives word line 341*a*, which provides the word line signal to the memory circuits of pixel drive circuits 1Fa and 2Fa of vertical section of pixel drive circuits 301LF. Word line 314*a* passes under the pixel circuits of vertical section of pixel drive circuits 301LN without making electrical connection. In like manner word line drive LFb drives word line 314*b*, which provides the word line signal to the memory circuits of pixel drive circuits 1Fb and 2Fb of vertical section of pixel drive circuits 301LF. Word line drivers LFc, LFd, and LFe drive word lines 314*c*, 314*d* and 314*e* respectively, which provide word line signal to the memory circuits of the pixel drive circuits of their respective rows.

Trigger circuit 303LN delivers a bit line driver trigger signal to bit line drivers 306LN1 and 306LN2 of row of bit line driver circuits 312LN. This releases the data previously loaded onto bit line drivers 306LN1 and 306LN2 by display controller 302LN. The data and its complement are loaded onto complementary bit lines 313LN1 by bit line driver 306LN1 and onto complementary bit lines 313LN2 by bit line driver 306LN2.

Trigger circuit 303LF delivers a bit line driver trigger signal to bit line drivers 306LF1 and 306LF2 of row of bit line driver circuits 312LF. This releases the data previously loaded onto bit drivers 306LF1 and 306LF2 by display controller 302LF. The data and its complement are loaded onto complementary bit lines 313LF1 by bit line driver 306LF1 and onto complementary bit lines 313LF2 by bit line driver 306LF2.

Control over timing of the word line and the bit line is essential to the efficient operation of a backplane. In general, the bit line at a particular pixel of a selected row has to be loaded with the complementary data for that pixel before its word line is pulled high. It is also important that the previous word line held high should be turned off before the data for the new pixel of the next selected row reaches the pixel of the old row. Turning off the word line for the old row can be accomplished by either removing the word line trigger signal for cases where the word line trigger signal is required or by selecting the new row in the case where there is no word line release signal.

Figure 3B:
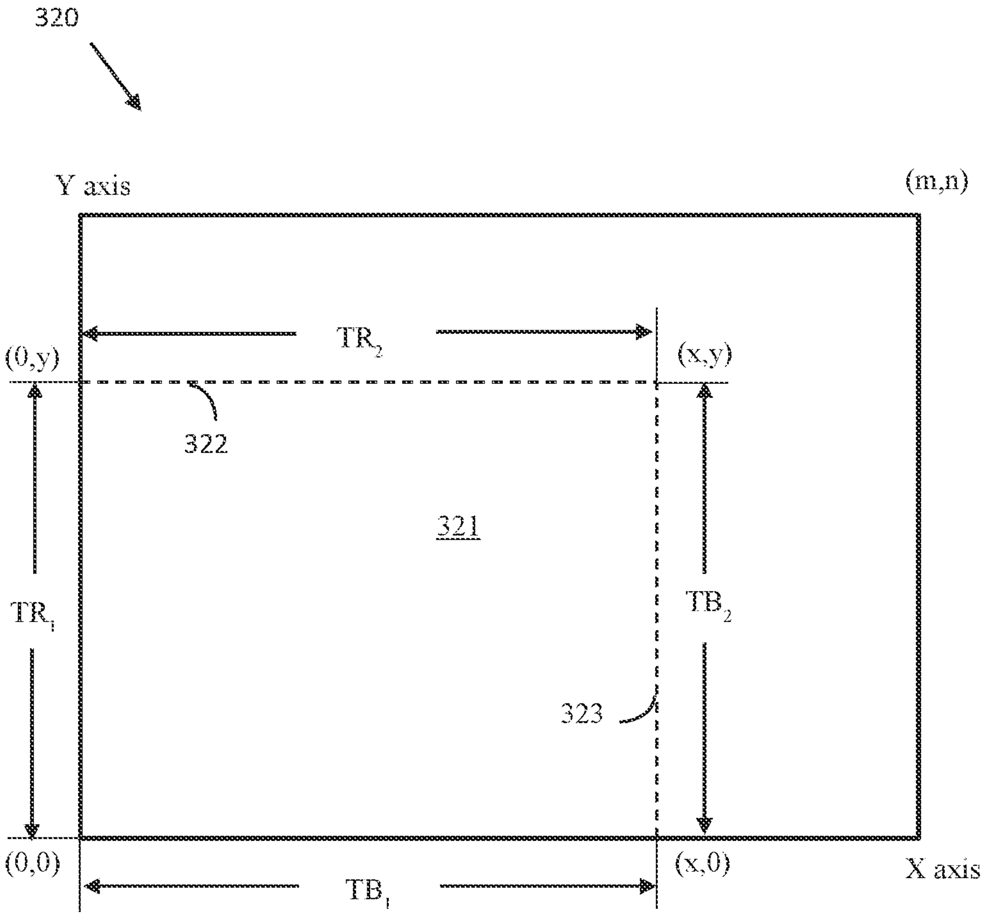
FIG. 3B is an illustration of time delays for delivery of data to the memory elements of a pixel drive circuit.

In FIG. 3B, an SRAM array 320 that is m columns wide by n rows high is presented for discussion of propagation delay. For this example, a bit line trigger signal for the release of image data onto the bitlines and a word line trigger signal to activate circuitry associated with the row drivers to pull the wordline high are presumed to originate in circuitry proximate to coordinates (0,0) in the lower left-hand corner of the array. It is understood that trigger signals may originate in more than one location. For example, one location may be proximate to the lower left corner of the pixel array and a second location may be proximate to the lower right corner of the pixel array, and wherein the lower left trigger circuit location may handle the left half of the array and the lower right trigger circuit location may handle the right half of the array.

In an embodiment after the system of FIG. 2A, a display controller may be located at a position away from the corner of the array. In addition, word lines associated with that display controller may also burrow or pass under a section of pixel drive circuits to reach a portion of an array where the word lines do connect to the memory circuits of pixel drive circuits. These positions do add to the time required for the word line to pull high at a particular point on the array, but the added time can be taken into account and the added time due to the requirement to pass under another section of pixel drive circuits is invariant for pixels within that portion of the array. The difference in time to propagate across the pixels of that portion of the display once the signal reaches the closest pixel circuit is determined by the RC characteristic of the word line in that section.

Considering the wordline path above, the time from when the word line trigger signal is sent from coordinates adjacent to coordinate (0, 0) to the AND gate until the word line trigger signal arrives at the AND gate adjacent to coordinate (0, y) is depicted as $TR_1$. $TR_1$ represents the time required for the bit line trigger signal to propagate from the point adjacent to coordinate (0, 0) to coordinate (0, y). The use of distance to represent time is appropriate because the propagation delay along that path has a uniform characteristic when the circuits carrying a signal on that part of the path are uniform and repetitive. The second part of the path is wordline 322. The wordline for an array of SRAM type memory cells is connected to the gates of pass transistors such as transistors 158 and 159 of SRAM circuit 150 of FIG. 1D. The resistance of the wordline conductor and the capacitance of the wordline and of the connections to the pass transistors define the RC characteristic of the wordline and therefore the propagation delay of the wordline. The RC characteristic of the wordline may differ from the RC characteristic of the line on which the word line trigger signal used as an input to the AND gate at each row driver propagates.

In the case wherein the pixel pitch in the x direction is a uniform X distance units laterally across the display and the pixel pitch in the y direction is a uniform Y distance units vertically on the display, pixel location (x, y) is at a physical position relative to the origin at (0, 0) of X distance units times x laterally and Y distance units times y vertically. The choice of distance unit is arbitrary, although most modern pixels are specified in microns, or millionths of a meter from center to center.

The same considerations can be applied to other display geometries such as a parallelogram provide the opposite sides are of equal length and parallel, such as a rhomboid. It can also be applied in modified form to a display with a pixel format that is anamorphic on one of its principal axes. The principle difference is that the pixel pitch on that axis is not uniform, requiring use of other types of calculations for distance, such as a lookup table.

There are other delays inherent in logic components such as AND gates. These delays are of uniform character for each row and do not vary from row to row, making them predictable in that all pixels of all rows have the same delay from that source inherent upon them.

As an example, consider the pixel circuit at coordinates (x, y) of FIG. 3B. The pixel drive circuit on the row immediately below it will be located at coordinates (x, y−1) and the pixel drive circuit on the row immediately above it will be located at coordinates (x, y+1.) The time for a signal to propagate from coordinate (0,y) at the left edge of the array to coordinate (x, y) is identical to the time required for a signal to propagate from coordinate (0, y−1) to coordinate (x, y−1) and to the time required for a signal to propagate from coordinate (0, y+1) to coordinate (x, y+1). The time required for a signal to propagate from coordinate (0, 0) to coordinate (0, y) is greater than the time required for a signal to propagate from coordinate (0, 0) to coordinate (0, y−1) and less than the time required for a signal to propagate from coordinate (0, 0) to coordinate (0, y+1). This results from the difference in path length along the Y-axis.

The time from when the bit line trigger signal to the bit line driver to release complementary data onto the bitlines is initiated and its arrival at the bit line driver and the time from the release of data from the bit line drivers until the data arrives at the pixel of interest (x, y) in the array together require a variable amount of time, wherein that variation depends mainly on the path lengths of the two segments and the individual RC (resistance and capacitance) characteristics of the circuits forming the two segments along which this propagates.

The path that brings the bit line trigger signal from the bit line trigger initiating circuit to the bit line driver extends from coordinates (0, 0) to (x, 0) along the X-axis of array 320. The time required for the signal to propagate that distance is designated as $TB_1$. The duration of $TB_1$ is determined by the RC characteristic of the conductor over which the bit line trigger signal propagates. The RC characteristic is in turn determined by the physical characteristics of the conductor, which comprise resistive and capacitive coupling components and the physical characteristics of any transistor nodes along the path, which primarily comprise capacitive coupling components. This may be thought of as a network. The actual voltage of the bit line trigger signal does not affect the RC characteristic of a network.

The second part of the path that delivers image data over the complementary bitlines to the pixel of interest is initiated when the image data is released from the bit line driver circuit. There are inherent delays within the bit line driver circuits that are substantially identical for all columns. The propagation delay from the time the image data is released onto the bitlines for the pixel of interest until the image data arrives at the pixel of interest on the selected row depends on the distance from the bit line driver to the pixel of interest in addition to the bitline characteristics, especially the RC delay. For analysis, the time delay is noted as $TB_2$. $TB_2$ is the time required for the image data to propagate from coordinate (x,0) to coordinate (x, y) of the pixel of interest over bit lines 323. The additional delay due to various logic circuits can be lumped together as $TB_3$ (not shown) and treated as a constant value not dependent on the pixel position. The total delay $TB_{TOT}$ (not shown) due to propagation delay from the bit line trigger source to the pixel of interest is $TB_{TOT}=TB_1+TB_2+TB_3$.

The wordline path begins with the path from a word line trigger initiation that delivers the word line trigger signal up the side of the display from coordinate (0,0) to coordinate (0,y). The actual path is slightly outside the array but is parallel to the Y-axis as depicted. The time required for the word line trigger signal to propagate along this first path is TR1. The duration of TR1 is, as before, determined by the RC characteristic of the line over which the word line trigger signal propagates to reach the row driver at coordinate (0,y). The second part of the wordline path is the wordline itself. The wordline on the selected row is pulled high when the word line trigger signal reaches the AND gate which forms part of the row driver circuit. The propagation time, $TR_2$, is determined by the RC characteristics of the wordline. The additional delay due to various logic circuits can be lumped together as $TR_3$ (not shown) and treated as a constant value not dependent on the pixel position. The total delay $TR_{TOT}$ (not shown) due to propagation delay from the word line trigger source to the pixel of interest is defined as $TR_{TOT}=TR_1+TR_2+TR_3$.

An observation based on the calculations for FIG. 3B is that the physical length associated with the path for $TB_1$ added to the length of the path $TB_2$ is substantially equal to the physical length associated with the path for $TR_1$ added to the length of the path for $TR_2$. Another evident characteristic is that the physical length associated with $TR_1$ is substantially equal to the physical length associated with $TB_2$ and the physical length associated with TR2 is substantially equal to the physical length associated with $TB_1$.

Note that the RC characteristic associated with the path for $TR_1$ is not likely to match the RC characteristic associated with the path for $TR_2$ absent a serious design requirement to make those RC characteristics match, and that the RC characteristic associated with the path for $TB_1$ does not need to match the RC characteristic associated with the path for $TB_2$. If both the RC characteristic and the physical length associated with a first circuit are substantially equal to the RC characteristic and physical length associated with a second circuit, then the propagation delay along the two circuits will be substantially equal.

Based on the observation above that the physical path length associated with $TR_1$ is substantially equal to the physical path length associated with $TB_2$, it follows that the propagation delays associated with the two physical paths can yield similar propagation delays if the RC characteristics of the two physical paths are substantially the same. The same consideration regarding RC characteristics applies to the case of the path length associated with $TR_2$ and the path length associated with $TB_1$. The difficulty lies in identifying means by which the entire length of the circuit carrying the word line trigger signal to the row decoder can be RC matched to the bitlines acting as circuits to carry data to the pixels of the selected row.

This and a similar consideration for RC matching between the path length associated with the bit line trigger signal to the bit line driver and the wordline from the row decoder to the pixel of interest (x, y) is addressed in the present application. Stated in other terms, it is important that the equation $TR_1+TR_2=TB_1+TB_2$ is substantially satisfied. The design procedures disclosed in the present application support achieving that result.

RC matching is the subject of significant development effort in the design of semiconductor devices. Much of the work is devoted to design techniques and practices that reduce the effects of any mismatches in RC matching. While useful for many pure memory designs, techniques such as dividing the wordline into many sub wordlines are less useful in the field of displays based on memory devices at each pixel when the goal is to write an entire line of data to the display as rapidly as possible rather than to write a single word to a portion of a row.

Figure 3C:
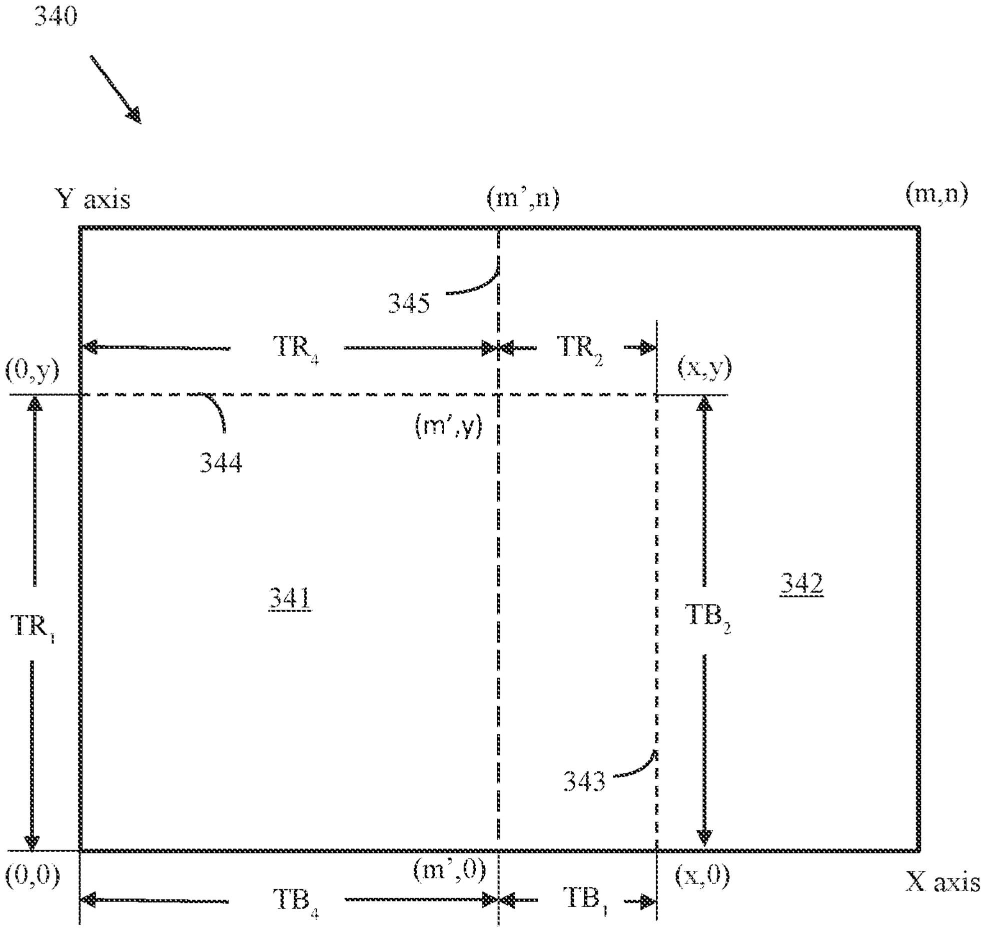
FIG. 3C is an illustration of time delays in a section of a display located further from its bit line drivers than other sections.

FIG. 3C depicts a case wherein the display is divided into vertical sections 341 and 342. Again SRAM array 340 comprises an array of pixel drive circuits, each comprising a memory cell, of m columns by n rows. The dividing line for vertical sections 341 and 342 is vertical dashed line 345 between coordinates (m', 0) and (m', n) M' is m prime. If m'=m/2, then the two vertical sections are of equal width. For engineering or other reasons, one vertical section may be wider than the other within the bounds of this invention. In one embodiment, the display comprises four vertical sections, of which the present example shows a left half. While the example emphasizes one pixel drive circuit at coordinate (x, y) it is understood that pixel drive circuits at all coordinates must operate as the example does in order for the solution to be a general one.

The calculations for this example are an extension of those developed for FIG. 3B. The differences are in the presence on the word line of an extended section underneath a vertical section wherein the word line does not interact with the pixel circuits above it and a similarly long section caused by the display controller for that vertical section needing to reach the left edge of the display. The latter is required since the area comprising the array of pixel drive circuits must be continuous and cannot have gaps in it to accommodate other types of circuitry.

The general approach in this embodiment is to make the time required for the word line high signal to propagate from the word line driver at coordinate (0, y) to the target pixel at coordinates (x, y) equal to the time required for the bit line trigger signal to propagate from the circuit near coordinates (0,0) to the bit line driver at coordinate (x, 0). A second part of the current approach is to make the time required for the word line trigger signal to propagate from the circuit near coordinates (0, 0) to the row decoder and word line select circuit at coordinate (0, y) substantially equal to the time required for the complementary bit line data to propagate up complementary bit lines 343 to the target pixel at coordinates (x, y).

Signals in FIG. 3C are started from a circuit near coordinate (0, 0) in the lower left corner of array 340 in one embodiment. The coordinates may should be considered as represent the rows and column of array 340.

Signal $TR_1$ represents the propagation time for a word line trigger signal. A word line trigger signal requiring time $TR_1$ to propagate originates in a circuit positioned near coordinate (0, 0) and is delivered to an AND gate (not shown) in the row decoder and word line circuit for each row. The second input to the AND gate is the signal from the row decoder circuit of the row select circuitry. Since only one row is selected, only one AND gate has its logic satisfied and holds the word line for that row high.

In one embodiment, the AND gate is not used and a tri-state buffer is used in its place. A tristate buffer has one input, which is the data from the word line decoder, and an enable signal, which in this case is the row decoder and word line trigger signal. Before the word line trigger signal is asserted on the enable terminal, the output of the tri-state buffer floats. Afterwards, the driver for the rows not selected are low and the drive for the selected row is high. This performs somewhat the same function logically as the AND gate but does not continuously drive the on state word line.

Once the word line driver output is pulled high, the word line signal propagates down word line 344 beginning at coordinate (0, y). The first segment requires time $TR_4$ to propagate across vertical section 341 of array 340. Wordline 344 does not interact with any of the pixel drive circuits of vertical section 341 but wordline 344 does interact with all of the pixel drive circuits of vertical section 342, thereby creating a condition where the RC characteristic of the part of word line 344 with vertical section 341 is different to the RC characteristic of the part of word line 344 within vertical section 342. It is estimated that the capacitance of the section within vertical section 341 is lower than the capacitance of the section of word line 344 within vertical section 342, although this is less important than the possibility that the RC time constant in the two vertical sections may be different. The portion of word line 344 within vertical 342 actually extends to coordinate (m, y). The termination at coordinate (x, Y) is to facilitate the remainder of the discussion regarding propagation delay.

The total time $T_{TOT\_WLINE}$ required for a word line signal to reach coordinate (x, y). The components are the time $TR_1$ required for the word line trigger signal to reach the selected row, $TR_3$ for the time required to satisfy the AND gate logic, $TR_4$ for the propagation time across vertical section 341, and $TR_2$ for the time required to reach coordinate (x, y) within vertical 342. This may be stated in closed form as $T_{TOT\_WLINE}=TR_1+TR_2+TR_3+TR_4$ Releasing the bit line data onto the complementary bit lines for delivery to pixels on a selected row creates a second timing issue that must be taken into account. The bit line trigger signal originates in a circuit near coordinate (0, 0) and propagates to a bit line driver (not shown) at coordinate (x, 0). Bit line data is loaded onto complementary bit lines in response to the receipt of the bit line trigger signal. The complementary data propagates on bit lines 343 to coordinate (x, y) where it can be loaded onto the SRAM memory cell located at that coordinate.

In one embodiment, the output of a bit line memory data cell is asserted on a tri-state buffer. A tristate buffer has one data input, which is the pixel data from the bit line memory cell, and an enable signal in the form of a bit line trigger signal. Before the bit line trigger signal is asserted on the enable terminal, the output of the tri-state buffer floats. This effectively prevents the new bit line data from encountering a word line that is still high from the previous row write sequence. All bit line drivers in all of the various embodiments of this disclosure may operate in this manner.

In order for the bit line trigger signal propagation delays $TB_4$ and $TB_1$ to match the propagation delays $TR_4$ and $TR_2$ on word line 344, it must match the RC time constant for the section of word line 344 that passes under vertical section 341 and the RC time constant for the section of word line 344 that passes under vertical section 342. In other words, $TR_4=TB_4$ and $TR_2=TB_1$ as close as possible.

Word line 344 propagation time $TR_4$ through vertical section 341 is invariant since all pixel drive circuits responsive to word line 344 lie within vertical section 342 and all signals directed to pixel drive circuits in vertical section 342 must transit vertical section 341. As a result, bit line trigger signal propagation time in a region parallel to vertical section 341 should be invariant as well. In one embodiment, $TR_4 \neq TB_4$ and in fact $TR_4 \geq TB_4$. The inequality may result from using a direct line not parallel to vertical section 341. Additional delay elements located elsewhere may compensate for the inequality in that case.

The portion of word line 344 that serves the pixel drive circuits of vertical section 342 does interact with all the pixel drive circuits found along row y associated with coordinates (x, y). The time $TR_2$ required for the word line signal to propagate to coordinate (x, y) from coordinate (m', y), the point at which it enters vertical section 342, should be the same as time $TB_1$, the time required for the bit line trigger signal to propagate from a point adjacent to coordinate (m', 0) to coordinate (x, 0), the location of the bit line driver. Circumstances under which a shortened bit line driver trigger circuit delivers a trigger signal along a trigger circuit parallel to a part, but not all, of the lower base of vertical section 341 is conceived and can be accommodated by compensating delays generated by other circuits.

The most efficient way to match propagation delay is to match the RC characteristics and the length of word line 344 on the bit line trigger signal line. Applicant notes that using same type circuit in both locations will result in a similar RC characteristic provided the capacitances on the two circuits remain substantially the same. In the case of word line 344, the design requirements of the word line are dictated by the design whereas the design requirements of the bit line trigger circuit used to deliver the bit line signal are more flexible. By designing in the use of a circuit similar to the word line to deliver the bit line trigger signal to the bit line driver, the propagation characteristics of the two circuits should be substantially alike. The regular geometry of the array of pixel drive circuits supports that implementation.

In the case of the propagation of the complementary bit line data on the bit line, a similar approach can be taken with respect to the propagation of the word line trigger signal. The structure of the complementary bit lines 343 is determined by the data requirements for the SRAM memory cell and by the pitch of the pixel drive circuits. Again it is possible to use an identical structure to deliver the word line release signal to the row decoder and word line drive circuits. This case is simpler because bit line circuits 343 only propagate through active pixel drive circuits and has the potential to interact with a pixel circuit on any row, although it will in a given instance only interact with the one for which the word line signal is high.

The examples disclosed herein describe the present invention. Those of skill in the art will recognize there are minor variations on the present invention that would have a similar function. Applicant holds that such minor variations fall within the scope of this disclosure.

What is claimed is:

1. A display system, comprising:

a first word line driver including a far section and a near section;

a second word line driver;

a plurality of independent segments of pixel drive circuits of a backplane, the plurality of independent segments of pixel drive circuits being disposed between the first word line driver and the second word line driver, the first word line driver being aligned parallel to the second word line driver; and a plurality of display controller circuits configured to control the plurality of independent segments of pixel drive circuits, the far section and the near section are associated with separate display controllers of the plurality of display controller circuits the plurality of independent segments of pixel drive circuits each including pixel drive circuitry corresponding with a memory element.

2. The display system of claim 1, wherein the first word line driver is vertically aligned, at least one of the plurality of independent segments is vertically aligned.

3. The display system of claim 1, wherein each of the plurality of display controller circuits is associated with one of the plurality of independent segments of pixel driver circuits.

4. The display system of claim 1, further comprising:

an image data preprocessor configured to be communicatively coupled to the plurality of display controller circuits, the image data preprocessor being configured to separate image data into each of the plurality of independent segments of pixel drive circuits.

5. The display system of claim 1, wherein at least one of the plurality of independent segments includes a dummy metal structure.

6. The display system of claim 1, wherein the first word line driver is communicatively coupled to a first of the plurality of independent segments by a word line that passes under a second of the plurality of independent segments without making an electrical connection to the second of the plurality of independent segments.

7. The display system of claim 1, wherein a first of the plurality of independent segments is not of equal width with a second of the plurality of independent segments.

8. The display system of claim 1, wherein the far section is disposed between the near section and the plurality of independent segments of pixel drive circuits.

9. A backplane, comprising:

a first word line driver;

a second word line driver aligned parallel to the first word line driver;

an array of pixel drive circuits having a first section and a second section, the first section of the array of pixel drive circuits and the second section of the array of pixel drive circuits being vertically aligned, the array of pixel drive circuits being disposed between the first word line driver and the second word line driver, the first word line driver including a far section and a near section, the far section configured to control the first section and the near section configured to control the second section;

a first display controller circuit configured to control the first section of the array of pixel drive circuits; and a second display controller circuit configured to control the second section of the array of pixel drive circuits, the first section of the array of pixel drive circuits including a memory element and pixel drive circuitry corresponding with the memory element.

10. The backplane of claim 9, wherein the first word line driver is vertically aligned.

11. The backplane of claim 9, further comprising:

an image data preprocessor communicatively coupled to the first display controller circuit and the second display controller circuit, the image data preprocessor being configured to separate image data into each of the first display controller circuit and the second display controller circuit.

12. The backplane of claim 9, wherein at least one of the first section of the array of pixel drive circuits or the second section of the array of pixel drive circuits includes a dummy metal structure.

13. The backplane of claim 9, further comprising:

a word line driver communicatively coupled to the first section of the array of pixel drive circuits by a word line that passes under the second section of the array of pixel drive circuits without making an electrical connection and to the second section of the array of pixel drive circuits.

14. The backplane of claim 9, wherein the first section of the array of pixel drive circuits has a width not equal to a width of the second section of the array of pixel drive circuits.

15. The backplane of claim 9, wherein the far section is disposed between the array of pixel drive circuits and the near section.

16. A backplane, comprising:

a first word line driver including a far section and a near section;

a second word line driver;

an array of pixel drive circuits disposed between the first word line driver and the second word line driver, the array of pixel driver circuits having a first section and a second section, the first section of the array of pixel drive circuits being aligned parallel with the second section of the array of pixel drive circuits, the far section configured to control the first section and the near section configured to control the second section;

a first display controller circuit configured to control the first section of the array of pixel drive circuits; and a second display controller circuit configured to control the second section of the array of pixel drive circuits.

17. The backplane of claim 16, wherein the first section of the array of pixel drive circuits includes a memory element and pixel drive circuitry corresponding with the memory element.

18. The backplane of claim 16, further comprising:

a word line driver communicatively coupled to the first section of the array of pixel drive circuits by a word line that passes under the second section of the array of pixel drive circuits without making an electrical connection and to the second section of the array of pixel drive circuits.

19. The backplane of claim 16, further comprising:

an image data preprocessor communicatively coupled to the first display controller circuit and the second display controller circuit, the image data preprocessor being configured to separate image data into each of the first display controller circuit and the second display controller circuit.

* * * * *